US010287367B2

(12) United States Patent
Huang et al.

(10) Patent No.: US 10,287,367 B2
(45) Date of Patent: *May 14, 2019

(54) PROCESS FOR THE REMOVAL OF RUBBER FROM TKS PLANT MATTER

(71) Applicant: Bridgestone Corporation, Chuo-ku (JP)

(72) Inventors: Yingyi Huang, Hudson, OH (US); Hiroshi Mouri, Chuo-ku (JP); Michael R. Beaulieu, Lodi, OH (US)

(73) Assignee: Bridgestone Corporation, Chuo-ku (JP)

( * ) Notice: Subject to any disclaimer, the term of this patent is extended or adjusted under 35 U.S.C. 154(b) by 14 days.

This patent is subject to a terminal disclaimer.

(21) Appl. No.: 15/430,938

(22) Filed: Feb. 13, 2017

(65) Prior Publication Data

US 2017/0152326 A1 Jun. 1, 2017

Related U.S. Application Data

(62) Division of application No. 14/483,455, filed on Sep. 11, 2014, now Pat. No. 9,567,457.

(60) Provisional application No. 61/876,463, filed on Sep. 11, 2013.

(51) Int. Cl.
*C08C 2/02* (2006.01)
*C08L 21/00* (2006.01)
*C08C 1/00* (2006.01)
*C08C 1/02* (2006.01)
*C08C 1/04* (2006.01)
*C08C 1/14* (2006.01)
*C08C 2/06* (2006.01)
*C08C 3/02* (2006.01)
*C08L 7/00* (2006.01)
*C08L 7/02* (2006.01)

(52) U.S. Cl.
CPC .................. *C08C 2/02* (2013.01); *C08C 1/00* (2013.01); *C08C 1/02* (2013.01); *C08C 1/04* (2013.01); *C08C 1/14* (2013.01); *C08C 2/06* (2013.01); *C08C 3/02* (2013.01); *C08L 7/00* (2013.01); *C08L 7/02* (2013.01); *C08L 21/00* (2013.01)

(58) Field of Classification Search
CPC .... C08C 2/00; C08C 2/02; C08C 2/06; C08C 1/00; C08C 1/02; C08C 1/04; C08C 1/14; C08C 3/02; C08L 21/00; C08L 7/00; C08L 7/02

See application file for complete search history.

(56) References Cited

U.S. PATENT DOCUMENTS

| 702,678 A | 6/1902 | Prampolini |
| 741,258 A | 10/1903 | Lawrence |
| 814,407 A | 3/1906 | Von Stechow |
| 843,567 A | 2/1907 | Bradshaw |
| 957,495 A | 5/1910 | Chute et al. |
| 979,902 A | 9/1910 | Van der Linde |
| 999,493 A | 8/1911 | Ellis |
| 999,708 A | 8/1911 | Ellis |
| 1,003,139 A | 9/1911 | Kelley |
| 1,007,681 A | 11/1911 | Ellis |
| 1,051,987 A | 2/1913 | Chute |
| 1,103,903 A | 7/1914 | Kendall |
| 1,105,568 A | 7/1914 | Kendall |
| 1,135,236 A | 4/1915 | Wheeler et al. |
| 1,161,135 A | 11/1915 | Kaminski et al. |
| 1,167,264 A | 1/1916 | Brooks |
| 1,189,549 A | 7/1916 | Ellis |
| 1,189,550 A | 7/1916 | Ellis |
| 1,242,886 A | 10/1917 | Meyer |
| 1,247,814 A | 11/1917 | Garza |
| 1,550,319 A | 8/1925 | Hopkinson |
| 1,671,570 A | 5/1928 | Carnahan |
| 1,695,676 A | 12/1928 | Yeandle |
| 1,735,835 A | 11/1929 | Kohno |
| 1,740,079 A | 12/1929 | Edison |
| 1,753,184 A | 4/1930 | Spence |
| 1,753,185 A | 4/1930 | Spence |
| 1,829,502 A | 10/1931 | Calcott et al. |
| 1,989,502 A | 10/1931 | Calcott et al. |
| 1,833,287 A | 11/1931 | Hadley |
| 1,903,500 A | 4/1933 | Calcott |
| 2,138,895 A | 12/1938 | Wiezevich |
| 2,187,146 A | 1/1940 | Calcott et al. |
| 2,281,336 A | 4/1942 | Stacom |
| 2,339,418 A | 1/1944 | McKay |

(Continued)

FOREIGN PATENT DOCUMENTS

AU 2012202924 A 5/1942
CN 1442193 A 4/2003

(Continued)

OTHER PUBLICATIONS

International Search Report with Written Opinion from PCT Application No. PCT/US2014/055086, 10 pages, dated Feb. 5, 2015.
Office action in Chinese application No. 2013-80031854 dated Sep. 11, 2015.
Reynolds, Cynthia, "The Russians are Coming," www2.macleans.ca/2011/08/11/the-russians-are-coming, Aug. 11, 2011.
Beintema, Nienke, Rubber From Dandelions and Shrubs, Wageningen World, No. 1, 2012, pp. 16-17.
Third party observations submitted in PCT/US2013/041422 dated Nov. 21, 2014.
Schloman, W. W. Jr., "Processing Guayule for Latex and Bulk Rubber," Industrial Crops and Products, vol. 22 No. 1, pp. 41-47, 2005.

(Continued)

*Primary Examiner* — Frances Tischler
(74) *Attorney, Agent, or Firm* — Meredith E. Hooker; Jenny L. Sheaffer

(57) ABSTRACT

Provided herein are organic solvent-based processes for the removal of rubber from non-*Hevea* plants such as TKS. By the use of the processes, solid purified rubber can be obtained that contains 0.05-0.5 weight % dirt, 0.2-1.5 weight % ash, and 0.1-4 weight % resin (when it has been dried so as to contain 0.8 weight % volatile matter).

18 Claims, No Drawings

(56) References Cited

U.S. PATENT DOCUMENTS

| | | | |
|---|---|---|---|
| 2,364,394 A | 12/1944 | Sibley |
| 2,373,689 A | 4/1945 | Kenda |
| 2,387,521 A | 10/1945 | Martin |
| 2,390,860 A | 12/1945 | Williams |
| 2,399,156 A | 4/1946 | Stamberger et al. |
| 2,408,853 A | 10/1946 | Hoover et al. |
| 2,410,780 A | 11/1946 | Gracia |
| 2,410,781 A | 11/1946 | Gracia |
| 2,425,011 A | 8/1947 | Smith |
| 2,434,412 A | 1/1948 | Jones |
| 2,459,369 A | 1/1949 | Tint et al. |
| 2,475,141 A | 7/1949 | Jones |
| 2,522,136 A | 9/1950 | Schaffer |
| 2,549,763 A | 4/1951 | Banigan, Jr. et al. |
| 2,572,046 A | 10/1951 | Meeks et al. |
| 2,618,670 A | 11/1952 | Clark |
| 2,665,317 A | 1/1954 | Clark et al. |
| 2,744,125 A | 5/1956 | Meeks et al. |
| 2,864,561 A | 12/1958 | Mork |
| 3,141,281 A | 7/1964 | Guant et al. |
| 3,311,601 A | 3/1967 | Conley |
| 3,376,158 A | 4/1968 | Buser |
| 4,107,902 A | 8/1978 | Suggs |
| 4,122,012 A | 10/1978 | Vlasnik |
| 4,136,131 A | 1/1979 | Buchanan |
| 4,159,903 A | 7/1979 | Bauman |
| 4,198,324 A | 4/1980 | Lal et al. |
| 4,243,561 A | 1/1981 | Lal et al. |
| 4,246,001 A | 1/1981 | Bauman |
| 4,269,242 A | 5/1981 | Smith et al. |
| 4,272,436 A | 6/1981 | Lal et al. |
| 4,363,188 A | 12/1982 | Dastoor et al. |
| 4,376,189 A | 3/1983 | Trivette |
| 4,376,835 A | 3/1983 | Schmitt et al. |
| 4,376,853 A | 3/1983 | Gutierrez et al. |
| 4,405,532 A | 9/1983 | Gutierrez et al. |
| 4,410,656 A | 10/1983 | Coran et al. |
| 4,412,031 A | 10/1983 | Kitahara et al. |
| 4,412,041 A | 10/1983 | Kitahara et al. |
| 4,424,171 A | 1/1984 | Gutierrez et al. |
| 4,433,114 A | 2/1984 | Coran et al. |
| 4,434,266 A | 2/1984 | Trivette, Jr. |
| 4,435,337 A | 3/1984 | Kay et al. |
| 4,493,925 A | 1/1985 | Trivette, Jr. |
| 4,496,683 A | 1/1985 | Morita |
| 4,499,243 A | 2/1985 | Rader |
| 4,513,110 A | 4/1985 | Rader |
| 4,525,541 A | 6/1985 | Kitahara et al. |
| 4,526,929 A | 7/1985 | Kishida et al. |
| 4,526,959 A * | 7/1985 | Kay ............... C08J 11/06 526/348 |
| 4,530,995 A | 7/1985 | Gutierrez et al. |
| 4,542,191 A | 9/1985 | Kay et al. |
| 4,557,306 A | 12/1985 | Graves |
| 4,559,378 A | 12/1985 | Kay et al. |
| 4,568,711 A | 2/1986 | Kay et al. |
| 4,570,690 A | 2/1986 | Graves |
| 4,585,826 A | 4/1986 | Graves |
| 4,591,631 A | 5/1986 | Beattie et al. |
| 4,591,632 A | 5/1986 | Moore |
| 4,609,336 A | 9/1986 | Stevenson et al. |
| 4,616,068 A | 10/1986 | Schloman, Jr. et al. |
| 4,616,075 A * | 10/1986 | Malani ............. B29B 13/00 524/926 |
| 4,621,118 A | 11/1986 | Schloman et al. |
| 4,622,365 A | 11/1986 | Scholman, Jr. et al. |
| 4,623,713 A * | 11/1986 | Beinor ............. C08C 2/00 526/335 |
| 4,638,028 A | 1/1987 | Lui et al. |
| 4,647,607 A | 3/1987 | Kay et al. |
| 4,677,153 A | 6/1987 | Kitahara et al. |
| 4,678,860 A | 7/1987 | Kuester |
| 4,681,929 A | 7/1987 | Cole et al. |
| 4,684,715 A | 8/1987 | Kay et al. |
| 4,687,810 A | 8/1987 | Coran |
| 4,728,343 A | 3/1988 | Snyder |
| 4,739,037 A | 4/1988 | Kay et al. |
| 4,739,038 A | 4/1988 | Schloman, Jr. |
| 4,751,271 A | 6/1988 | Graves |
| 4,761,446 A | 8/1988 | Graves et al. |
| 4,762,870 A | 8/1988 | Graves et al. |
| 4,778,857 A | 10/1988 | Graves et al. |
| 4,786,683 A | 11/1988 | Schloman, Jr. et al. |
| 4,792,583 A | 12/1988 | Coran |
| 4,804,741 A | 2/1989 | Verbiscar et al. |
| 4,822,845 A | 4/1989 | Graves et al. |
| 4,829,117 A | 5/1989 | Schloman, Jr. et al. |
| 4,927,887 A | 5/1990 | Tate et al. |
| 4,975,497 A | 12/1990 | Tate et al. |
| 4,983,729 A | 1/1991 | Sikora |
| 4,988,388 A | 1/1991 | Schloman |
| 5,234,564 A | 8/1993 | Smith |
| 5,247,009 A | 9/1993 | Kitahara |
| 5,272,203 A | 12/1993 | Joyner |
| 5,306,862 A | 4/1994 | Cappell et al. |
| 5,321,111 A | 6/1994 | Ji |
| 5,362,807 A | 11/1994 | Nogura et al. |
| 5,379,948 A | 1/1995 | Teppo |
| 5,411,147 A | 5/1995 | Bond |
| 5,453,051 A | 9/1995 | Schlough |
| 5,468,539 A | 11/1995 | Crivelli |
| 5,473,024 A | 12/1995 | Thames et al. |
| 5,580,942 A | 12/1996 | Cornish |
| 5,599,868 A | 2/1997 | Bohm et al. |
| 5,616,075 A | 4/1997 | Winstanley et al. |
| 5,633,433 A | 5/1997 | Backhaus et al. |
| 5,645,234 A | 7/1997 | Del Zotto |
| 5,651,953 A | 7/1997 | Yokoyama et al. |
| 5,717,050 A | 2/1998 | Cornish |
| 5,872,186 A | 2/1999 | Ang |
| 5,998,512 A | 12/1999 | Schloman |
| 6,014,998 A | 1/2000 | Mowdood |
| 6,054,525 A | 4/2000 | Schloman et al. |
| 6,132,711 A | 10/2000 | Backhaus et al. |
| 6,231,970 B1 | 5/2001 | Andersen et al. |
| 6,382,425 B1 | 5/2002 | Brickner et al. |
| 6,399,673 B1 | 6/2002 | Thames et al. |
| 6,482,884 B1 | 11/2002 | Schaal |
| 6,645,747 B1 | 11/2003 | Hallahan et al. |
| 6,726,025 B1 | 4/2004 | Huskey |
| 6,734,245 B2 | 5/2004 | Baranek |
| 6,787,590 B2 | 9/2004 | Nakayama et al. |
| 6,818,676 B2 | 11/2004 | Koffler et al. |
| 7,026,678 B2 | 4/2006 | Coursey |
| 7,205,456 B2 | 4/2007 | Hallahan et al. |
| 7,228,881 B1 | 6/2007 | Smith |
| 7,259,231 B2 | 8/2007 | Cornish et al. |
| 7,540,438 B2 | 6/2009 | Buranov |
| 7,629,397 B2 | 12/2009 | McDonald et al. |
| 7,790,036 B2 | 9/2010 | Cornish et al. |
| 7,851,210 B2 | 12/2010 | Darling et al. |
| 7,923,039 B2 | 4/2011 | Cornish et al. |
| 7,955,611 B2 | 6/2011 | Brown et al. |
| 8,013,213 B2 | 9/2011 | Mau et al. |
| 8,080,358 B2 | 12/2011 | Murakami |
| 8,241,873 B2 | 8/2012 | Diner et al. |
| 8,268,121 B2 | 9/2012 | Blount |
| 8,815,965 B2 | 8/2014 | Cole et al. |
| 9,138,660 B2 | 9/2015 | Yahamoto |
| 9,315,589 B2 | 4/2016 | Huang et al. |
| 9,328,211 B2 | 5/2016 | Nemoto et al. |
| 9,546,224 B2 | 1/2017 | Cole et al. |
| 9,562,720 B2 | 2/2017 | Huang et al. |
| 9,611,334 B2 | 4/2017 | Huang et al. |
| 9,637,562 B2 | 5/2017 | Huang et al. |
| 9,890,262 B2 | 2/2018 | Huang et al. |
| 10,023,660 B2 | 7/2018 | Huang et al. |
| 10,113,011 B2 | 10/2018 | Cole et al. |
| 10,132,563 B2 | 11/2018 | Huang et al. |
| 10,138,304 B2 | 11/2018 | Huang et al. |
| 2002/0006987 A1 | 1/2002 | Nakayama |
| 2003/0138403 A1 | 7/2003 | Drustrup et al. |
| 2004/0265343 A1 | 12/2004 | Hill |
| 2005/0011812 A1 | 1/2005 | Nelson |

(56) References Cited

U.S. PATENT DOCUMENTS

| | | |
|---|---|---|
| 2005/0050759 A1 | 3/2005 | Chandran et al. |
| 2006/0070167 A1 | 4/2006 | Eng et al. |
| 2006/0106183 A1 | 5/2006 | Cornish et al. |
| 2006/0149015 A1 | 7/2006 | Cornish et al. |
| 2006/0217512 A1 | 9/2006 | Mau et al. |
| 2006/0218660 A1 | 9/2006 | Dong et al. |
| 2006/0225144 A1 | 10/2006 | Hallahan et al. |
| 2007/0265408 A1 | 11/2007 | Cornish et al. |
| 2007/0276112 A1 | 11/2007 | Buranov |
| 2008/0015336 A1 | 1/2008 | Cornish et al. |
| 2008/0172998 A1 | 7/2008 | Fraley et al. |
| 2008/0221246 A1 | 9/2008 | Imam et al. |
| 2008/0300526 A1 | 12/2008 | Gumbs |
| 2008/0317933 A1 | 12/2008 | Williamson |
| 2009/0054595 A1 | 2/2009 | Cornish et al. |
| 2009/0099309 A1 | 4/2009 | Gumbs |
| 2009/0099327 A1 | 4/2009 | Cornish et al. |
| 2009/0163689 A1 | 6/2009 | Cornish et al. |
| 2009/0191243 A9 | 7/2009 | Hill et al. |
| 2009/0199425 A1 | 8/2009 | Taylor |
| 2009/0256375 A1 | 10/2009 | Haskins |
| 2010/0210745 A1 | 8/2010 | McDaniel et al. |
| 2011/0021743 A1 | 1/2011 | Cornish et al. |
| 2011/0054051 A1 | 3/2011 | Cole et al. |
| 2011/0275142 A1 | 11/2011 | Wade et al. |
| 2013/0029009 A1 | 1/2013 | Darling et al. |
| 2013/0067808 A1 | 3/2013 | Stachon et al. |
| 2014/0336288 A1 | 11/2014 | Cole et al. |
| 2015/0018459 A1 | 1/2015 | Huang |
| 2015/0073113 A1 | 3/2015 | Huang et al. |
| 2015/0126673 A1 | 5/2015 | Randall et al. |
| 2015/0136882 A1 | 5/2015 | Huang et al. |
| 2015/0184933 A1 | 7/2015 | Huang et al. |
| 2015/0190848 A1 | 7/2015 | Huang et al. |
| 2017/0081429 A1 | 5/2017 | Cole et al. |
| 2017/0146291 A1 | 5/2017 | Huang et al. |
| 2017/0152326 A1 | 6/2017 | Huang et al. |
| 2017/0226309 A1 | 8/2017 | Huang et al. |

FOREIGN PATENT DOCUMENTS

| | | |
|---|---|---|
| CN | 1860850 A | 11/2006 |
| CN | 101671404 A | 3/2010 |
| CN | 101906176 A | 12/2010 |
| EA | 2011170418 A1 | 12/2011 |
| EP | 87109 A1 | 8/1983 |
| EP | 100434 A2 | 2/1984 |
| EP | 105822 A2 | 4/1984 |
| EP | 0164137 A2 | 12/1985 |
| EP | 179211 A1 | 4/1986 |
| EP | 180716 A1 | 5/1986 |
| EP | 87109 B1 | 10/1986 |
| EP | 0039910 B1 | 4/1987 |
| EP | 105822 B1 | 6/1988 |
| EP | 180716 B1 | 4/1989 |
| EP | 164137 B1 | 6/1990 |
| EP | 476641 B1 | 3/1992 |
| EP | 491229 B1 | 6/1992 |
| EP | 0509768 A2 | 10/1992 |
| EP | 938350 B1 | 11/2006 |
| EP | 1752277 A2 | 2/2007 |
| EP | 675202 A1 | 10/2009 |
| EP | 1969036 B1 | 3/2011 |
| GB | 545410 A | 5/1942 |
| GB | 2164341 A | 3/1986 |
| GB | 2174403 A | 11/1986 |
| JP | S61-264005 A | 11/1986 |
| JP | 62000502 A | 1/1987 |
| JP | H06-100704 A | 4/1994 |
| JP | H08-283309 A | 10/1996 |
| JP | H11-12036 A | 1/1999 |
| JP | H11-012306 A | 1/1999 |
| JP | 2003-040902 A | 1/2003 |
| JP | 2003-313366 A | 11/2003 |
| JP | 2006348607 A | 12/2006 |
| JP | 2007-126676 A | 5/2007 |
| JP | 2007224067 A | 9/2007 |
| RU | 2027746 C1 | 1/1995 |
| SU | 15590 A1 | 6/1930 |
| SU | 47819 A1 | 7/1936 |
| SU | 47820 A1 | 7/1936 |
| SU | 50447 A1 | 11/1936 |
| SU | 72175 A1 | 11/1947 |
| WO | 1981003255 A1 | 11/1981 |
| WO | 9803255 A1 | 1/1998 |
| WO | 2001010946 A2 | 2/2001 |
| WO | 2001049257 A1 | 7/2001 |
| WO | 2009054595 A1 | 2/2009 |
| WO | 2009095059 A1 | 8/2009 |
| WO | 2009-129249 A2 | 10/2009 |
| WO | 2013-134429 A1 | 9/2013 |
| WO | 2013-134430 A1 | 9/2013 |
| WO | 2013134429 A1 | 9/2013 |
| WO | 2013-173625 A1 | 11/2013 |
| WO | 2013173625 A1 | 11/2013 |
| WO | 2013192182 A1 | 12/2013 |
| WO | 2013192217 A1 | 12/2013 |
| WO | 2013192227 A1 | 12/2013 |
| WO | 2015038707 A1 | 3/2015 |

OTHER PUBLICATIONS

International Preliminary Report on Patentability & Written Opinion in PCT/US2013/029451 dated Sep. 2, 2014.
Search Report in PCT/US2013/029451 dated Jun. 21, 2013.
International Preliminary Report on Patentability & Written Opinion in PCT/US2013/029449 dated Sep. 22, 2014.
Search Report in PCT/US2013/029449 dated Jun. 21, 2013.
Supplemental European Search Report in EP national stage from PCT/US2013/029451 dated Oct. 26, 2015.
Supplemental European Search Report in EP national stage from PCT/US2013/029449 dated Oct. 26, 2015.
Search Report from PCT/US2013/041422 dated Nov. 21, 2013.
International Preliminary Report on Patentability and Written Opinion from PCT/US2013/041422 dated Nov. 18, 2014.
Pages 408-410 from Rubber and Rubber-Plants book, ed. B.A. Keller, published 1936.
Buranov, Anvar et al., "Rubber-Bearing Plants of Central Asia," Conf. Title Industrial Crops and Rural Development, Conf. date Sep. 17, 2005.
Print out from http://www.lifescience.ca/DAT/CATALOGUE/211~v~Polymer_Solubility_Index.pdf, author Jordi Labs, printed Aug. 5, 2014.
International Products Brochure 2007.
Belmares, H. et al. New Rubber Peptizers and Coatings Derived from Guayule Resin, Industrial and Engineering Chemistry: Product Research and Development, vol. 19, pp. 107-111 (1980).
Kuester, J.L., Liquid Hydrocarbon Fuels From Biomass (1981).
Schloman, W.W. Jr., et al., Guayule Byproduct Evaluation: Extract Characterization, J. Agricultural and Food Chemistry, vol. 31, pp. 873-876 (1983).
Schloman, W.W. Jr. et al., Rubber Additives Derived from Guayule Resin, Industrial and Eng'r Chem. Research, vol. 27, pp. 712-716 (1988).
Schloman, W.W. Jr., et al., Water Stress and Seasonal Effects on Rubber Quality in Irrigateed Guayule, J. Agricultural and Food Chemistry vol. 34, pp. 683-685 (1986).
Schloman, W. W. Jr., et al., Seasonal Effects on Guayule Resin Composition, J. Agricultrual and Food Chemistry, vol. 34, pp. 177-179 (1986).
Meeker, T.R.; Specialty Isoprene Based Polymers—Derivatives From the General Purpose Polymers; Doc. 1848; Spring 1985.
Rubber Developments vol. 39, No. 1, pp. 23-24; Your Questions Answered (1986).
Murphy, J. Brad and C.A. Stutte; Analyitical Biochemistry 86, 220-228 (1978); Analysis for Substituted Benzoic and Cinnamic Acids Using High-Pressure Liquid Chromatography.
Himayah H. Naovi and George P. Hanson; American Journal of Botany, vol. 69, No. 6 (Jul. 1982) pp. 985-989; Germination and

(56) References Cited

OTHER PUBLICATIONS

Growth Inhibitors in Guayule (Parthenium argentatum Gray) Chaff and Their Possible Influence in Seed Dormancy.
Subramaniam, A., J. Rubb. Res. Inst. Malaysia 25(2), 61-68; estimation of Aldehyde Groups in Natural Rubber with 2, 4-dinitrophenylhydrazine (1977).
Touzinsky, G.F.; Northern Regional Research Center, Agricultural Research, Science and Education Administration; Guayule as a Source of papermaking Fiber, 5th International Dissolving Pulps Conference, Vienna, pp. 311-315 (1980).
Benedict, H.M. The Effect of Waste Products From the Guayule Rubber Mill on the Growth of Various Crops. Journal of the American Society of Agronomy, vol. 40: pp. 1005-1016 (1948)
Bonner, J., and A.W. Galson. Toxic Substances from the Culture Media of Guayule Which May Inhibit Growth. Botanical Gazette, vol. 106; pp. 185-198 (1994).
Chang, M., and G.T. Tsao. Hydrolysis of Guayule Cellulose for Alcohol Production. E.C. Gregg, J.L. Tipton and H.T. Huang, ends., Proceedings of the Third International Guayule Conference, Pasadena, Clif., Guayule Rubber Soc.: Riverside, Calif., pp. 211-224 (1983).
Gelling, I.R. Modification of Natural Rubber Latex With Peracetic Acid. Rubber Chemistry and Technology. vol. 58, pp. 86-96. (1985).
Keller, R.W., D.S. Winkler, and H.L. Stephens. Degradative Effects of Guayule Resin on Natural Rubber. Rubber Chemistry and Technology. vol. 54, pp. 115-123, (1981).
King, R.J., and D.M. Mondimore. HPLC Procedure for the determination of Free Sulfur in Natural Rubber Formulations, Rubber Chemistry and Technology. vol. 60, pp. 716-720 (1987).
Kuester, J.L., C.M. Fernandez, T.C. Wang, and G. Heath. Liquid Hydrocarbon Fuel Potential of Agricultural Materials. In R.P. Overend, T.A. Milne, and L.K. Mudge, eds., International Conference on Fundamentals of Thermochemical Biomass Conversion, 1982, Estes Park Colo., Elsevier Applied Science: London, pp. 875-895 (1985).
Sin Siew Weng, Some Traditional and New Uses of Skim Rubber, Rubber Research Institute of Malaysia, Proceedings of RRIM Planters Conference (1981).
Rysselberge, Jacques Van, Utilisation De Bitumes Elastomeres (1976).
ASTM International, Standard Test Methods for Rubber from Natural Sources—Chemical Analysis, D 1278, 2002, pp. 246-251.
Curtis, JR., "Distribution of Rubber and Resins in Guayule", Plance Physiology, vol. 22, No. 4, pp. 333-359 (dated Oct. 1947).
Doering, "Guayule Rubber in Tires and Tubes, Service Tests in Which the Rubber was Exclusively Guayule", Industrial and EngineeringChemistry, vol. 26, No. 5, pp. 541-543, (dated May 1934).
Makitra, et al., "Dependence of Natural Rubber Swelling Index Upon Organic Solvents Properties", Chemistry & Chemical Technology, vol. 5, No. 1, pp. 19-24 (dated 2011).
McIntyre, et al., "Guayule Rubber," Handbook of Elastomers, pp. 1-27 (dated 2001).
Abstract—Week 200365 Thomson Scientific, London, GB; AN 2003-682828; XP000002567182, JP 2003 040902 A (Nitto Denko Corp) (dated Feb. 13, 2003).
Adler, R.J. et al., Freeze Coagulation of ABS Latex, Ind. Eng. Chem. Res. vol. 36 pp. 2156-2162 (dated 1997).
Bhowmich, et al. Effect of Resin Components on the Degradation of Guayule Rubber, Journal of Applied Polymer Science, vol. 30, pp. 2367-2388 (dated 1985).
Cataldo, F. Guayule Rubber: A New Possible World Scenario for the Production of Natural Rubber Progress in Rubber and Plastics Technology, vol. 16, No. 1 (dated 2000).
Tanaka, Y. Structural Characterization of Natural Polyisoprenes: Solve the Mystery of Natural Rubber Based on Structural Study Rubber Chemistry and Technology vol. 74, 355. (dated 2001).
Van Beillen, Jan B, et al., "Guayule and Russian dandelion as alternative sources of natural rubber," CRC Critical Reviews in Biotechnology, CRC Press, vol. 27, No. 1, Jan. 2007, pp. 217-231.

Presentation pages by Schloman, W.W., Jr. undated (submitted via third party observations in PCT/US2013/041422 on Aug. 6, 2014).
Decanters from GEA Westfalia Separator, Mechanical Separation, GE Westfalia Separator, www.westfalia-separator.com (2010).
Bedane, G. M., et al., Development and Evaluation of a Guayule Debarker, Industrial Crops and Products, vol. 34, pp. 1256-1261 (2011).
Centrifugation and Centrifuges, Lenntech, accessed Dec. 6, 2011 at http://www.lenntech.com/library/clarification/centrifugation.htm.
Extraction Decanters from GEA Westfalia Separator, GEA Westfalia Separator Group, accessed May 30, 2012 at http://www.westfalia-separator.com/products/decanters/extraction-decanters.html.
Crown Model IV and Model V Extractors, Flyer, Crown Iron Works Company, accessed Jul. 30, 2015 at http://www.crowniron.com/userfiles/image/specialty%20extractor%20insert1.pdf (dated Nov. 2006).
Screw press, Wikipedia, accessed May 28, 2012 at http://wikipedia.org/wiki/screw_press.
Biosolids Dewatering, Promotional Mateiral, FKC Co. Ltd., accessed Jul. 30, 2015 at http://fkescrewpress.com/docs/fkcbiosolids2.pdf.
Screw Press Operating Hints (CC series), Vincent Corporation, accessed May 31, 2012 at http://www.vincentcorp.com/screw_press_operating_hints_%28cp%20series%29 (dated Mar. 26, 2009).
Vincent Corporation, Screw Press Operating Hints, Sep. 17, 2009.
Stillage Dewatering Screw Press, Promotional Material, FKC Co. Ltd, accessed Jul. 30, 2015 at http://www.fkescrewpress.com/docs/spentgrain_stillageflyerweb.pdf.
Buranov, Anvar U., et al., Extraction and Characterization of Latex and Natural Rubber from Rubber-Bearing Plants, J. Agric. Food Chem. 2010, 58, 734-743.
Australian Patent Exam Report for 2009236328 dated Jul. 2, 2013.
Second Australian Patent Exam Report 2009236328 dated Jan. 30, 2014.
Response to Australian Office Action, (dated Dec. 23, 2013).
First Office Action in Chinese Application No. 2009801224454 (dated Mar. 27, 2012).
Second Office Action in Chinese Application No. 2009801224454 (dated Jun. 27, 2012).
Response to the Extended European Search Report dated Mar. 8, 2012.
Response to European Office Action dated Sep. 20, 2012.
Communication pursuant to Article 94(3) EPC dated Jan. 15, 2013.
Invitation pursuant to Article 94 (3) and Rule 71(1) EPC dated Feb. 8, 2013.
Response to EPO dated Apr. 9, 2013.
Notification of Intent to Grant from European Patent Office dated Jun. 12, 2013.
EP 09733501 Communication Pursuant to Article 94(3) EPC, (dated May 10, 2012).
Extended Search Report, EP 09733501 (dated Aug. 19, 2011).
Japanese Office Action for 2011-505140 dated Jan. 7, 2014.
International Preliminary Report on Patentability and Written Opinion (corresponding PCT Application No. PCT/US2009/040543): Authorized Officer Athina Nckitas-Etienne: (8 pages) (dated Oct. 19, 2010).
International Search Report (corresponding PCT Application No. PCT/US2009/040543); Authorized Officer Kang, Hyunk Seok; (2 pages) (dated Nov. 9, 2009).
Non-final Office Action issued in U.S. Appl. No. 12/934,284 dated Dec. 11, 2012.
Response filed in U.S. Appl. No. 12/934,284 on Jun. 13, 2013.
Final Office Action issued in U.S. Appl. No. 12/937,284 dated May 31, 2013.
Response filed in U.S. Appl. No. 12/937,284 on Oct. 30, 2013.
Non-final Office Action issued in U.S. Appl. No. 12/937,284 dated Nov. 13, 2013.
Response filed in U.S. Appl. No. 12/937,284 on Mar. 31, 2014.
Notice of allowance issued in U.S. Appl. No. 12/937,284 dated Apr. 16, 2014.
Response filed May 2016 in AU application 2013230936.
Examination report issued in application No. AU2013230936 (dated Feb. 26, 2016).
Response filed on Apr. 22, 2016 in AU application 2013230935.

(56) References Cited

OTHER PUBLICATIONS

Examination report issued in application No. AU2013230935 (dated Feb. 25, 2016).
Office Action issued in application No. CN2013-80021313.9 (dated Jun. 2, 2015).
Office Action issued in application No. CN2013-80021313.9 (dated Nov. 3, 2015).
Office Action issued in application No. CN201380021313.9 (dated Jan. 18, 2016).
Third Office Action dated May 2016 in CN application 201380023740.0.
Office Action issued in application No. CN2013-80023740.0 (dated May 26, 2015).
Office Action issued in application No. CN2013-80023740.0 (dated Dec. 16, 2015).
Response submitted in application No. EP13758291.2 (filed Apr. 14, 2016).
Response submitted in application No. EP13757665.8 (filed Apr. 14, 2016).
Response filed Jul. 31, 2015 in U.S. Appl. No. 14/383,379.
Notice of Allowance dated Aug. 19, 2015 in U.S. Appl. No. 14/383,379.
Notice of allowanced dated Feb. 29, 2016 in U.S. Appl. No. 14/383,379.
Office action dated Apr. 12, 2016 in U.S. Appl. No. 14/383,380.
Response submitted Jul. 7, 2016 in U.S. Appl. No. 14/383,380.
Final Office Action dated Jul. 21, 2016 in U.S. Appl. No. 14/383,380.
Examination report dated Mar. 2016 in AU application 2013262725.
Response filed in AU application 2013262725 (Aug. 10, 2016).
Second Office Action issued in CN application 20130031854.X (dated May 13, 2016).
Third Office Action issued in CN application 20130031854.X (dated May 26, 2016).
Supplemental Search Report and opinion dated May 2016 in application EP 13792144.0.
Notice of allowance dated May 2016 in U.S. Appl. No. 14/409,132.
Examination report dated May 2016 in AU application 2013277296.
Response filed Jul. 1, 2016 in AU application 2013277296.
Supplemental Search Report and opinion dated Feb. 2016 in EP application 13807874.2
Response submitted Jul. 12, 2016 in EP application 13807874.2.
Examination report dated May 2, 2016 in AU application 2013277335.
Response submitted Jul. 1, 2016 in AU application 2013277335.
Second Office Action dated May 2016 in CN application 201380032039.5.
Office Action issued in application No. CN2013-80032039.5 (dated Sep. 1, 2015).
Supplemental Search Report and opinion dated Feb. 2016 in EP application 13806430.8.
Response filed Jun. 23, 2016 in EP application 13806430.8.
Examination Report dated Feb. 2106 in AU application 2013277286.
Response filed May 2016 in AU application 2013277286.
Second Office Action dated May 2016 in CN application 201380032056.9.
Office Action issued in application No. CN2013-80032056.9 (dated Sep. 6, 2015), Sep. 8, 2016.
Supplemental Search Report and opinion dated Feb. 2016 in EP application 13807611.2.
Response filed May 19, 2016 in EP application 13807611.2.
Agricultural Encyclopedia of China (Volume of Crops), vol. one, compiled by Editorial Dept. form Agricultural Encyclopedia of China, pp. 719-720, China Agricultural Press, Apr. 1991.
Notice of Allowance issued in U.S. Appl. No. 14/338,581 dated Aug. 30, 2016.
Response filed in AU application No. 2009-236328 in Apr. 2014.
Office action dated Feb. 2018 in U.S. Appl. No. 15/364,527.
Response filed in May 2018 in U.S. Appl. No. 15/364,527.
Notice of allowance dated Jun. 2018 in U.S. Appl. No. 15/364,527.
Examination report issued in application No. AU2016222428 (dated Jan. 2017).

Response filed in Aug. 2017 in AU application 2016222428.
Examination report issued in application AU2016213719 (dated Jan. 2017).
Response filed in application AU2016213719 in Mar. 2017.
Office Action issued in application No. CN201380021313.9 (dated Dec. 2016).
Fourth Office Action issued in application No. CN2013-80023740.0 (dated Oct. 2016).
Decision of Rejection issued in application No. CN2013-80023740.0 (dated May 2017).
Notification of Reexamination issued in application No. CN2013-80023740.0 (dated Jun. 2017).
European Search Report in EP application (16205645), dated May 11, 2017.
European Search Report and Opinion in EP application 17168837, dated Jun. 30, 2017 and May 29, 2017.
Office action issued in RU application No. 2014140181 dated Feb. 14, 2017.
Office action issued in RU application No. 2014140183 dated Feb. 10, 2017.
Office action dated May 4, 2015 in U.S. Appl. No. 14/383,379.
Response submitted Sep. 1, 2016 in U.S. Appl. No. 14/383,380.
Notice of allowance dated Dec. 27, 2017 in U.S. Appl. No. 14/383,380.
Office action dated Jul. 29, 2016 in U.S. Appl. No. 15/130,050.
Response filed Oct. 13, 2016 in U.S. Appl. No. 15/130,050.
Notice of allowance dated Nov. 21, 2016 in U.S. Appl. No. 15/130,050.
Non-final office action rejection from U.S. Appl. No. 15/477,152 dated Jun. 28, 2017.
Response filed Sep. 28, 2017 in U.S. Appl. No. 15/477,152.
Notice of allowance dated Oct. 6, 2017 in U.S. Appl. No. 15/477,152.
Office action dated Oct. 9, 2018 in U.S. Appl. No. 15/498,983.
Response filed Jan. 9, 2019 in U.S. Appl. No. 15/498,983.
Office action issued in Mexican application MX/a/2014/010721 dated May 2018.
Office action issued in Mexican application MX/a/2014/010720 dated May 2018.
Second examination report dated Aug. 23, 2016 in AU application 2013262725.
Response filed in AU application 2013262725 (Sep. 12, 2016).
Allowance dated Sep. 23, 2016 in AU application 2013262725.
Examination reported issued in AU application 2017200069 dated Aug. 2017.
Response filed in AU application 2017200069 in Mar. 2018.
Notification of grant in AU application 2017200069, dated Apr. 2018.
Office action issued in CN application 201710590888.2 (dated May 2018).
Response filed in application EP13792144.0 on Aug. 30, 2016.
Office action issued in RU application 2014150798 dated Apr. 5, 2017.
International Preliminary Report on Patentability and Written Opinion from PCT/US2013/046409, dated Dec. 23, 2014.
Search Report from PCT/US2013/046409, dated Oct. 12, 2013.
Non-final office action from U.S. Appl. No. 14/401,749, dated Aug. 24, 2017.
Allowance dated Aug. 2016 in AU application 2013277296.
Second office action from application CN201380032071.3, dated Aug. 29, 2017.
First office action from application CN201380032071.3, dated Feb. 7, 2017.
Office action from application CN201380032071.3, dated Sep. 2018.
Office action issued in RU application 2015101234 dated Mar. 29, 2017.
Notice of allowance dated Nov. 2016 in U.S. Appl. No. 14/409,132.
Notice of allowance dated Feb. 27, 2018 in U.S. Appl. No. 15/424,224.
Allowance dated Aug. 2016 in AU application 2013277335.
Third Office Action dated Nov. 2016 in CN application 201380032039.5.
Search Report from PCT/US13/46328, dated Oct. 11, 2013.

(56) References Cited

OTHER PUBLICATIONS

International Preliminary Report on Patentability and Written Opinion from PCT/US13/46328, dated Dec. 23, 2014.
Office action dated Jan. 2018 in U.S. Appl. No. 14/409,117.
Response filed Apr. 2018 in U.S. Appl. No. 14/409,117.
Office action dated Jun. 2018 in U.S. Appl. No. 14/409,117.
Response filed Sep. 2018 in U.S. Appl. No. 14/409,117.
Office action dated Dec. 2018 in U.S. Appl. No. 14/409,117.
Allowance dated Jun. 2016 in AU application 2013277286.
Examination reported dated Jun. 2017 in AU application 2016235014.
Response filed Apr. 2018 in AU application 2016235014.
Third Office Action issued in application No. CN2013-80032056.9 (dated Nov. 2016).
Grant notice dated Sep. 2016 in EP application 13807611.2.
Search report from EP application 17152493.7 dated May 2017.
Response filed in EP application No. 17152493.7 Oct. 16, 2017.
Grant notice dated Jan. 2018 in EP application No. 17152493.7.
Office action issued in application RU2015101287, dated Apr. 2017.
Office action issued in application RU2015101287, dated Jul. 2017.
Office action dated Jan. 2018 in U.S. Appl. No. 14/409,124.
Response filed Apr. 2018 in U.S. Appl. No. 14/409,124.
Notice of allowance dated Jul. 2018 in U.S. Appl. No. 14/409,124.
Search Report from PCT/US13/46380, dated Oct. 9, 2013.
International Preliminary Report on Patentability and Written Opinion from PCT/US13/46380, dated Dec. 23, 2013.
Office Action from U.S. Appl. No. 14/483,455, dated Apr. 27, 2016.
Response filed in U.S. Appl. No. 14/483,455 on Aug. 26, 2016.
Final Office Action from U.S. Appl. No. 14/483,455, dated Sep. 16, 2016.
Response filed in U.S. Appl. No. 14/483,455 on Sep. 22, 2016.
Notice of Allowance issued in U.S. Appl. No. 14/483,455 dated Sep. 29, 2016.

\* cited by examiner

PROCESS FOR THE REMOVAL OF RUBBER FROM TKS PLANT MATTER

CROSS REFERENCE TO RELATED APPLICATIONS

This application is a divisional of U.S. application Ser. No. 14/483,455 filed Sep. 11, 2014, which claims priority to and any other benefit of U.S. Provisional Application Ser. No. 61/876,463, filed Sep. 11, 2013, each of which are hereby incorporated herein by reference in their entirety.

FIELD

The present disclosure relates to processes for the removal of rubber from TKS plant matter; such processes isolate rubber from the plant matter and also reduce the amount of resin present in the isolated rubber.

BACKGROUND

The *Hevea* plant or tree (also called *Hevea brasiliensis* or a rubber tree) is a well-known source of natural rubber (also called polyisoprene). Rubber sources such as *Hevea brasiliensis*, *Ficus elastic* (India rubber tree) and *Cryptostegia grandiflora* (Madagascar rubbervine) produce natural rubber in the form of a sap where the rubber is suspended in an aqueous solution that flows freely and can be recovered by tapping of the plant. Various non-*Hevea* plants are also known to contain natural rubber, but their rubber is stored within the individual cells of the plant (e.g., stem, crown, root or leaves) and cannot be accessed by tapping but can only be accessed by breaking down the cell walls by physical or other means. Thus, processes for the removal of rubber from non-*Hevea* plants are generally more complicated and entailed than processes for harvesting rubber from *Hevea* trees.

SUMMARY

Provided herein are organic solvent-based processes for the removal of rubber from non-*Hevea* plants such as TKS. The processes are suitable for use in a laboratory or pilot plant and are scalable to a commercial-size plant that is designed to collect large quantities of rubber from non-*Hevea* plants such as TKS.

In a first embodiment, a multi-step process for the removal of rubber from TKS plant matter is provided. In this process, initially, a slurry containing (i) plant matter from TKS (where the plant matter comprises bagasse, rubber and resin), (ii) at least one non-polar organic solvent and (iii) at least one polar organic solvent, where (ii) and (iii) are present in amounts at least sufficient to solubilize the resin and rubber from the plant matter, is utilized. The slurry contains 10-50% by weight plant matter, 50-90% by weight of (ii) and (iii) combined, and 0.5-10 weight % water from the plant matter. A majority of the bagasse is removed from the slurry to produce a miscella. Optionally, additional polar organic solvent, non-polar organic solvent or a combination thereof (each of which may be the same or different than those utilized in the slurry of (a)) is added to the miscella to form a reduced viscosity miscella. The amount of any additional polar organic solvent that is added to the miscella is less than the amount that causes the rubber contained within the reduced viscosity miscella to coagulate. Next, 80-95 weight % of bagasse (based on the total weight of bagasse present in the reduced viscosity miscella or in the miscella that has had a majority of the bagasse removed) is removed from the miscella (either the reduced viscosity miscella resulting from addition of additional solvent(s) or the miscella that has had a majority of the bagasse removed) to form a purified miscella. The majority of bagasse that is removed in this second removal phase has a particle size of less than 105 microns. Optionally, the purified miscella is further treated to remove additional bagasse thereby producing a clarified rubber solution that contains 0.01-1% by weight bagasse (based on the total amount of bagasse present in the slurry); 90-99% of the additional bagasse that is removed has a particle size greater than 45 microns. The relative amount of polar organic solvent as compared to non-polar organic solvent within the clarified rubber solution or within the purified miscella is increased so as to cause the rubber contained within to coagulate. From the coagulated rubber, a solid purified rubber is produced. This solid purified rubber is such that when it contains 0.8 weight % volatile matter, it also contains 0.05-0.5 weight % dirt, 0.2-1.5 weight % ash, and 0.1-4 weight % resin. Multiple aspects of the process are conducted at a temperature or temperatures of 10-80° C. (i.e., different aspects of the process may be conducted at the same temperature or at different temperatures) and a pressure of 35 to 1000 kPa.

In a second embodiment, a process for increasing the rubber recovery from TKS plant matter is provided. The process comprises (A) utilizing briquettes comprising (i) compressed chopped TKS plant matter having an average size of 1.5" or less, the plant matter comprising bagasse, rubber, resin, and residual water and (ii) no more than 5 weight % leaves, crowns, stems and flowers from TKS, wherein the briquettes have a density that is 40-325% higher than the density of the non-compressed plant matter; (B) subjecting the briquettes to an organic solvent extraction process whereby the briquettes are mixed with at least one polar organic solvent and at least one non-polar organic solvent to form a slurry that contains 0.5-10 weight % water; and (C) processing the slurry to remove bagasse and resin and recover at least 95-99% by weight of the rubber contained within the briquettes.

DETAILED DESCRIPTION

Provided herein are processes for the removal of rubber from TKS plant matter. For ease of description, the processes are described as embodiments; the use of this terminology is for ease of description only and should not be interpreted as limiting upon the disclosed processes.

Definitions

The terminology as set forth herein is for description of the embodiments only and should not be construed as limiting the invention as a whole.

As used herein, the term non-*Hevea* plant is intended to encompass plants that contain natural rubber within the individual cells of the plant.

As used herein the term "bagasse" is used to refer to that portion of the ground or chopped plant matter from a non-*Hevea* plant that is insoluble and, hence, is suspended rather than dissolved by organic solvents. As used herein, bagasse should be understood to include dirt and ash, unless otherwise specified.

As used herein the term "plant matter" means material obtained from a non-*Hevea* plant. Unless otherwise specified, the plant matter may include roots, stems, bark, woody material, pith, leaves and dirt.

As used herein the term "woody material" means the vascular tissue and meristematic material obtained from a non-*Hevea* plant. Unless otherwise specified, woody material does not include bark.

As used herein the term "bark" refers to the tough outer covering present on the stems and roots of certain (particularly woody or shrub-like) non-*Hevea* plants and should be understood to include all tissues outside the vascular cambium. Not all non-*Hevea* plants will contain bark.

As used herein the term "resin" means the naturally occurring non-rubber chemical entities present in non-*Hevea* plant matter, including but not limited to resins (such as terpenes), fatty acids, proteins, and inorganic materials. The resin content of a natural rubber sample can be measured using acetone extraction, and, thus, the term "resin" is used interchangeably with the phrase "acetone extractables."

As used herein the term "dirt" (such as used in the connection with the solid purified rubber produced by the processes disclosed herein) means non-plant material that may be associated with non-*Hevea* plants, particularly upon harvesting, such as soil, sand, clay and small stones. Dirt content in solid purified rubber can be determined by completely re-dissolving the solid rubber and pouring the solution through a 45 micron sieve. The sieve is then rinsed with additional solvent and dried. The weight of the material retained on the sieve represents the "dirt" content of the solid purified rubber.

As used herein the term "ash" (such as used in the connection with the solid purified rubber produced by the processes disclosed herein) means the inorganic material (i.e., free of carbon) that remains after ashing the rubber at 550° C.±25° C.

As used herein, the term "majority" means more than 50% but less than 100%. In certain embodiments, the term means 51-60%, and in other embodiments 60-95%.

As used herein, the phrase "volatile matter" refers to non-rubber matter that may be contained within a sample of solid-purified rubber, but which will volatilize at 100+/−5° C. (or 160+/−5° C. if the rubber sample is suspected to contain volatile hydrocarbon oils). A standard test for determining the volatile matter that is contained within a rubber sample is ASTM D1278-91 (1997).

As used herein, the term "TKS" plant matter means plant matter from *Taraxacum kok-saghyz, Scorzonera tau-saghyz, Scorzonera uzbekistanica*, and combinations thereof; preferably, such plant matter comprises 90% by weight or more of root matter from one or more of the foregoing plants.

The Processes

In a first embodiment, a multi-step process for the removal of rubber from TKS plant matter is provided. Initially, a slurry containing (i) plant matter from TKS (where the plant matter comprises bagasse, rubber and resin), (ii) at least one non-polar organic solvent and (iii) at least one polar organic solvent is prepared. The slurry contains 10-50% by weight plant matter, 50-90% by weight of (ii) and (iii) combined, and 0.5-10 weight % water from the plant matter. A majority of the bagasse is removed from the slurry to produce a miscella. Optionally, additional polar organic solvent, non-polar organic solvent or a combination thereof (each of which may be the same or different than the solvents utilized in the slurry of (a)) is added to the miscella to form a reduced viscosity miscella. The amount of any additional polar organic solvent that is added to the miscella is less than the amount that causes the rubber contained within the reduced viscosity miscella to coagulate. Next, 80-95 weight % bagasse (based upon the total weight of bagasse present in the reduced viscosity miscella or in the miscella that has a majority of the bagasse removed) is removed from the reduced viscosity miscella or from the miscella which has had a majority of the bagasse removed to form a purified miscella. A majority of the bagasse that is removed (from the reduced viscosity miscella) has a particle size of less than 105 microns. Optionally, the purified miscella is further treated to remove additional bagasse thereby producing a clarified rubber solution that contains 0.01-1% by weight bagasse (based on the total amount of bagasse present in the slurry); 90-99% of the additional bagasse that is removed has a particle size greater than 45 microns. The relative amount of polar organic solvent as compared to non-polar organic solvent within the clarified rubber solution or within the purified miscella is increased so as to cause the rubber contained within to coagulate. From the coagulated rubber, a solid purified rubber is produced. This solid purified rubber is such that when it contains 0.8 weight % volatile matter, it also contains 0.05-0.5 weight % dirt, 0.2-1.5 weight % ash and 0.1-4 weight % resin. Multiple aspects of the process are conducted at a temperature or temperatures of 10-80° C. (i.e., different aspects of the process may be conducted at the same temperature or at different temperatures) and a pressure of 35 to 1000 kPa.

In a second embodiment, a process for increasing the rubber recovery from TKS plant matter is provided. The process comprises (A) utilizing briquettes comprising (i) compressed chopped plant matter having an average size of 1.5" or less (e.g., ⅛" to 1.5" or smaller, as discussed further below), comprising bagasse, rubber, resin, residual water and (ii) no more than 5 weight % leaves, stems, crowns, and flowers, wherein the briquettes have a density that is 40-325% higher than the density of the non-compressed plant matter; (B) subjecting the briquettes to an organic solvent extraction process whereby the briquettes are mixed with at least one polar organic solvent and at least one non-polar organic solvent to form a slurry that contains 0.5-10 weight % water; and (C) processing the slurry to remove bagasse and resin and recover at least 95-99% by weight of the rubber contained within the briquettes.

In certain particular embodiments of the processes of the first and second embodiments, the removal of bagasse in (b) comprises the use of a centrifuge. In such processes, initially, a slurry containing (i) chopped TKS plant matter (where the plant matter contain bagasse, resin and rubber) and (ii) a co-solvent comprised of at least one non-polar organic solvent and at least one polar organic solvent, where (i) is present in an amount of 10-50% by weight (based on the total weight of the slurry), (ii) is present in an amount of 50-90% by weight (based on the total weight of the slurry) and the at least one polar organic solvent is present in an amount of 10-40% by weight (based on the total amount of solvent) is utilized. (As explained below, in alternative embodiments of this process, the plant matter that is utilized is from a non-*Hevea* plant other than TKS.) The slurry is subjected to a centrifuging in order to remove 70-95% by weight bagasse (based on the total weight of bagasse present in the slurry) thereby producing a miscella. Optionally, additional polar organic solvent, non-polar organic solvent or a combination thereof (each of which may be the same or different than the organic solvents in the slurry) is added to the miscella to form a reduced viscosity miscella with a viscosity lower than 200 centipoise. The amount of any additional polar organic solvent that is added is less than the amount that causes the rubber contained with the reduced viscosity miscella to coagulate. Depending upon the type of centrifuge that is utilized when it is desirable to reduce the viscosity of the miscella, it may be possible to add some or all of the additional solvent directly to the machine(s) performing the extraction process so that the miscella exiting the extraction process is a reduced viscosity miscella with a viscosity lower than 200 centipoise. Next, additional bagasse, 80-95 weight % bagasse (based upon the total weight of bagasse present in the reduced viscosity miscella or in the miscella that has had at least 60% by weight bagasse removed) is removed from the reduced viscosity miscella or from the miscella to form a purified miscella. A majority of the bagasse that is removed in this second removal phase (i.e., from the reduced viscosity miscella or from the miscella that has had at least 60% by weight bagasse removed) has a particle size of less than 105 microns. Optionally, the purified miscella is further treated to remove additional bagasse thereby producing a clarified rubber solution that contains 0.01-1% by weight bagasse (based on the total weight of bagasse present in the slurry); 90-99% of the additional bagasse that is removed (from the purified miscella) has a particle size greater than 45 microns. The relative amount of polar organic solvent as compared to non-polar organic solvent within the clarified rubber solution or within the purified miscella is then increased so as to coagulate the rubber contained therein. The coagulated rubber is then isolated from the organic solvent to produce a solid rubber. When this solid rubber contains 0.8 weight % volatile matter, it also contains 0.05-0.5 weight % dirt, 0.2-1.5 weight % ash and 0.1-4 weight % resin. Multiple aspects of the process are conducted at a temperature or temperatures of 10-80° C. (i.e., different aspects of the process may be conducted at the same temperature or at different temperatures) and a pressure of 35-1000 kPa.

In certain particular embodiments of the processes of the first and second embodiments, the removal of bagasse in (b) comprises the use of an extraction decanter. Initially, a slurry containing (i) chopped TKS plant matter (where the plant matter contains bagasse, resin and rubber) and (ii) a co-solvent comprised of at least one non-polar organic solvent and at least one polar organic solvent, where (i) is present in an amount of 10-50% by weight (based on the total weight of the slurry), (ii) is present in an amount of 50-90% by weight (based on the total weight of the slurry) and the at least one polar organic solvent is present in an amount of 10-40% by weight (based on the total amount of solvent) is utilized. (As explained below, in alternative embodiments of this process, the plant matter that is utilized is from a non-*Hevea* plant other than TKS.) The slurry is subjected to an extraction decanting process (e.g., an extraction decanter) in order to remove 60-95% by weight of the bagasse (based on the total weight of bagasse present in the slurry) thereby producing a miscella. Optionally, additional polar organic solvent, non-polar organic solvent or a combination thereof (each of which may be the same or different than the organic solvents in the slurry) is added to the miscella to form a reduced viscosity miscella with a viscosity lower than 200 centipoise (e.g., 10-200 centipoise). The amount of any additional polar organic solvent that is added is less than the amount that causes the rubber contained with the reduced viscosity miscella to coagulate. Depending upon the type of extraction process that is utilized (e.g., an extraction decanter) when it is desirable to reduce the viscosity of the miscella, it may be possible to add some or all of the additional solvent directly to the machine(s) performing the extraction process so that the miscella exiting the extraction process is a reduced viscosity miscalls with a viscosity lower than 200 centipoise. Next, additional bagasse, 80-95 weight % bagasse (based upon the total weight of bagasse present in the reduced viscosity miscella or in the miscella that has had at least 60% by weight bagasse removed) is removed from the reduced viscosity miscella or from the miscella to form a purified miscella. A majority of the bagasse that is removed in this second removal phase (i.e., from the reduced viscosity miscella or from the miscella that has had at least 60% by weight bagasse removed) has a particle size of less than 105 microns. Optionally, the purified miscella is further treated to remove additional bagasse thereby producing a clarified rubber solution that contains 0.01-1% by weight bagasse (based on the total weight of bagasse present in the slurry); 90-99% of the additional bagasse that is removed (from the purified miscella) has a particle size greater than 45 microns. The relative amount of polar organic solvent as compared to non-polar organic solvent within the clarified rubber solution or within the purified miscella is then increased so as to coagulate the rubber contained therein. The coagulated rubber is then isolated from the organic solvent to produce a solid rubber. When this solid rubber contains 0.8 weight % volatile matter, it also contains 0.05-0.5 weight % dirt, 0.2-1.5 weight % ash and 0.1-4 weight % resin. Multiple aspects of the process are conducted at a temperature or temperatures of 10-80° C. (i.e., different aspects of the process may be conducted at the same temperature or at different temperatures) and a pressure of 35-1000 kPa.

In certain particular embodiments of the processes of the first and embodiments, the removal of bagasse in (b) comprises the use of a pressing process. Initially, a slurry containing (i) chopped plant matter from TKS (where the plant matter contains bagasse, resin and rubber) and (ii) a co-solvent comprised of at least one non-polar organic solvent and at least one polar organic solvent, where (i) is present in an amount of 5-50% by weight (based on the total weight of the slurry) and (ii) is present in an amount of 50-95% by weight (based on the total weight of the slurry) and the at least one polar organic solvent is present in an amount of 10-35% by weight (based on the total amount of solvent) is utilized. (As explained below, in alternative embodiments of this process, the plant matter that is utilized is from a non-*Hevea* plant other than TKS.) The slurry is subjected to a pressing process such as a "dewatering" process with a conveying screw inside a perforated cylinder (e.g., a screw press) in order to remove 51-60 weight % of the bagasse (based upon the total weight of the bagasse in the slurry), thereby producing a miscella. In certain embodiments of the third embodiment, it may be preferable to subject the bagasse to more than one round of pressing (e.g., through the screw press) with an additional amount of co-solvent being added to the bagasse press cake that is generated from the first pressing, thereby generating a second slurry that is subjected to another pressing with the two collections of liquor (the liquid containing the dissolved rubber and resin) being consolidated to form the miscella. Optionally, additional polar organic solvent, non-polar organic solvent or a combination thereof (each of which may be the same or different than the organic solvents in the slurry) is added to the miscella to form a reduced viscosity miscella with a viscosity lower than 200 centipoise (e.g., 10-200 centipoise). The amount of any additional polar organic solvent that is added is less than the amount that causes the rubber contained with the reduced viscosity miscella to coagulate. Next, 80-95 weight % bagasse (based upon the total weight of bagasse present in the reduced viscosity miscella or in the miscella that has had a 51-60% of the bagasse removed) is removed from the reduced viscosity miscella or from the miscella to form a purified miscella. A majority of the bagasse that is removed in this second removal phase (i.e., from the reduced viscosity miscella or the miscella that has had 51-60% of the bagasse removed) has a particle size of less than 105 microns. Optionally, the purified miscella is further treated to remove additional bagasse thereby producing a clarified rubber solution that contains 0.01-1% by weight bagasse (based on the total weight of bagasse present in the slurry); 90-99% of the additional bagasse that is removed (from the purified miscella) has a particle size greater than 45 microns. The relative amount of polar organic solvent as compared to non-polar organic solvent within the clarified rubber solution or within the purified miscella is then increased so as to coagulate the rubber contained therein. The coagulated rubber is then isolated from the organic solvent to produce a solid rubber. When this solid rubber contains 0.8 weight % volatile matter, it also contains 0.05-0.5 weight % dirt, 0.2-1.5 weight % ash and 0.1-4 weight % resin. Multiple aspects of the process are conducted at a temperature or temperatures of 10-80° C. (i.e., different aspects of the process may be conducted at the same temperature or at different temperatures) and a pressure of 35-1000 kPa.

Also provided herein, is a third embodiment wherein an organic solvent-based process is provided for purifying a solubilized TKS rubber solution that contains at least one non-polar solvent, at least one polar solvent, solubilized TKS rubber, up to 5-20 weight % bagasse and 0.5-10 weight % water (each based on the total weight of the solution). (As explained below, in alternative embodiments of this process, the plant matter that is utilized is from a non-*Hevea* plant other than TKS.) The process (which is conducted at a pressure of 35-1000 kPa) comprises centrifuging the solution at a g force of 500-3,500 to remove at least 90-99% by weight of the bagasse (based upon the total weight of bagasse present in the solution) thereby producing a purified miscella. A majority of the bagasse that is removed (from the solution) has a particle size of less than 105 microns. The purified miscella is then filtered to remove additional bagasse and produce a clarified rubber solution that contains 0.01-1% by weight bagasse (based on the amount of bagasse in the solution); 90-99% of the additional bagasse that is removed (from the solution to form the clarified rubber solution) has a particle size greater than 45 microns.

Also provided herein, is a fourth embodiment comprising a process for removing bagasse from a TKS-rubber containing slurry. As part of the process, a slurry containing at least one non-polar organic solvent, at least one polar organic solvent, and plant matter from TKS source is utilized. The plant matter comprises 1-15 weight % solubilized TKS rubber, 70-95 weight % bagasse and 3-20 weight % solubilized resin (As explained below, in alternative embodiments of this process, the plant matter that is utilized is from a non-*Hevea* plant other than TKS.) Within the slurry, the total amount of nonpolar and polar organic solvents is 50-90% by weight (based on the total weight of the slurry) and the amount of plant matter is 10-50% by weight (based on the total weight of the slurry). The slurry is moved into a decanter centrifuge that includes a discharge lock and the centrifuge is used to separate sufficient bagasse from the slurry to produce a miscella that contains (i) 60-95 weight % less bagasse than the slurry (based on the total amount of bagasse present in the slurry) and (ii) 1-10 weight % solubilized TKS rubber. The process is conducted at a pressure of 35-1000 kPa.

Types of Plant Matter/Sources of Bagasse

As previously mentioned, the processes disclosed herein are utilized with plant matter from non-*Hevea* plants. Depending upon the type of non-*Hevea* plant utilized, the relative amounts of rubber in each portion of the plant will differ. For example, in TKS plants, more than 90% of the rubber is contained within the roots; while the remainder of the rubber is contained within the crown and leaves. Depending upon the time of harvest, the crown and leaves of TKS plant comprise up to about 25% by weight of the plant matter; however, the crown and leaves include a substantial amount of pectin which can interfere with rubber recovery. Thus, in certain embodiments of the processes according to the first, second, third, and fourth embodiments disclosed herein, it is preferable to limit the amount of crown and leaf material that is utilized in the TKS plant matter and instead utilize mostly roots.

In preferred embodiments of the processes disclosed herein, the non-*Hevea* plant matter comprises 90% by weight or more of plant matter sourced from *Taraxacum kok-saghyz, Scorzonera tau-saghyz, Scorzonera uzbekistanica*, and combinations thereof (i.e., TKS). In particularly preferred embodiments of the processes disclosed herein, the non-*Hevea* plant matter comprises 90% by weight or more of roots sourced from *Taraxacum kok-saghyz, Scorzonera tau-saghyz, Scorzonera uzbekistanica*, and combinations thereof (i.e., TKS), or even 95% by weight or more of such roots. In sub-embodiments of the foregoing, the non-*Hevea* plant matter comprises 90% by weight or more roots sourced from *Taraxacum kok-saghyz*, 95% by weight or more roots sourced from *Taraxacum kok-saghyz*, 99% by weight or more roots sourced from *Taraxacum kok-saghyz*, or even 100% by weight of roots sourced from *Taraxacum kok-saghyz*.

Each of the above and below paragraphs which refer to certain aspects of the first, second, third and fourth embodiments of the processes described herein and utilize the term TKS plant matter should be understood to include in sub-embodiments each of the following as the plant matter: (i) 90% by weight or more of roots sourced from *Taraxacum kok-saghyz, Scorzonera tau-saghyz, Scorzonera uzbekistanica*, and combinations thereof, (ii) 90% by weight or more of roots sourced from *Taraxacum kok-saghyz, Scorzonera tau-saghyz, Scorzonera uzbekistanica*, and combinations thereof, (iii) 90% by weight or more roots sourced from *Taraxacum kok-saghyz*, (iv) 95% by weight or more roots sourced from *Taraxacum kok-saghyz*, (v) 99% by weight or more roots sourced from *Taraxacum kok-saghyz*, or (vi) 100% by weight of roots sourced from *Taraxacum kok-saghyz*, as if each of those sub-embodiments were expressly set forth in each of the paragraphs. All descriptions provided herein with respect to preparation of plant matter, slurries containing plant matter, and plant matter containing bagasse that is separated from the rubber and resin of the plant matter should be understood to encompass the use of TKS plant matter (i.e., from TKS), even if the particular explanation does not explicitly state that TKS plant matter is being addressed. Preferably, the processes disclosed herein are utilized with plant matter from TKS. When removing rubber from TKS plant matter in certain embodiments of each of the first, second, third, and fourth embodiments of the processes disclosed herein, it is contemplated that one type of plant or a mixtures of more than one type of plant may be utilized; for example, it is specifically contemplated that a mixture of different types of TKS plants could be utilized or even that a mixture of TKS plants and another non-*Hevea* plant such as guayule could be utilized (e.g., 90% or more TKS plant matter with up to 10% guayule plant matter; 95% or more TKS plant matter with up to 5% guayule plant matter; 10-90% by weight TKS plant matter with 90-10% by weight guayule plant matter). Preferably, according to each of the first, second, third and fourth embodiments disclosed herein, the plant matter utilized is from TKS.

Preparation of the Plant Matter

When the first, second, third, or fourth embodiments of the processes disclosed herein make use of plant matter from TKS, the plant matter that is utilized may take various forms as described further herein. The following discussion in this section should be understood to apply equally to the first, second, third and fourth embodiments of the processes disclosed herein. (Briquetting of the plant matter for use in the second embodiment of the processes disclosed herein and for use in certain embodiments of the first, third and fourth embodiments disclosed herein, is discussed in a separate section.) In certain embodiments of the processes disclosed herein, the plant matter comprises chopped TKS including roots and other parts from the plant but with no more than 5 weight %, preferably no more than 4 weight % or no more than 3 weight % or even more preferably no more than 1 weight % of the plant matter comprising leaves, stems, crowns, and flowers from the TKS plant; in certain embodiments, the amount of TKS plant matter comprising leaves, stems, crowns, and flowers is 1-5 weight % and in other embodiments, 0.5-5 weight %, 0.5-1 weight %, or even 0-1 weight %. In certain of the foregoing embodiments, the TKS plant used for the plant matter initially comprises both the above-ground portions (i.e., the stems, crowns, leaves and flowers) and below-ground portions of the plant (i.e, the roots). In other of the foregoing embodiments, the TKS plant used for the plant matter initially comprises only the below-ground portions of the plant (in other words, the stems, crowns, leaves, and flowers are not included in the plant matter that is utilized to prepare the slurry or the briquettes). The leaves, stems, crowns, and flowers of TKS may be removed using various methods such as field drying followed by shaking or cutting, simply cutting upon harvest or by harvest method (e.g., harvesting when the above-ground portions of the plant have seasonly died off). Other methods for removing the leaves, stems, crowns, and flowers from TKS may occur to those of skill in the art and may be utilized as the particular method for removing them is not considered to be a significant limitation of the processes disclosed herein. In certain embodiments where the plant matter comprises TKS, the plants are harvested by removing the entire plant (roots and above-ground portions) and allowing it to dry in the field (optionally having separated the above-ground portions from the roots) to a water content of no more than 20 weight %, preferably no more than 15 weight % or even no more than 10 weight % water; in certain embodiments, the plant matter comprises 5-20 weight % water, preferably 5-15 weight % water. Alternatively, in certain embodiments where the plant matter comprises TKS, the plants are harvested by removing only the root portion from the ground and allowing the roots to dry in the field to a water content of no more than 20 weight %, preferably no more than 15 weight % or even no more than 10 weight % water; in certain embodiments the root plant matter comprises 5-20 weight % water, preferably 5-15 weight % water after field drying. In other embodiments where the plant matter comprises TKS, the plants are harvested either by removing the entire plant (roots and above-ground portions) or by removing only the root portion and transporting the plant material to a different location for drying to a water content of no more than 20 weight %, preferably no more than 15 weight % or even no more than 10 weight % water; in certain embodiments the root plant matter comprises 5-20 weight % water, preferably 5-15 weight % water after drying. Thus, in certain embodiments of the processes according to the first and second embodiments disclosed herein, the TKS plant matter that is utilized in either the slurry or the briquettes has a water content of no more than 10 weight %.

In certain embodiments of the processes disclosed herein, the TKS plant matter utilized in the slurry has been chopped into pieces with an average size of 1" or less. The chipping or chopping may take place in one or more than one step. For example, the TKS plants that are utilized may be rough chopped at the location of harvesting (or elsewhere) into pieces averaging less than 2" in length. Alternatively, the TKS plant that is utilized may be rough chopped into pieces of about 3" in length. Rough chopping may take place before or after the optional removal of leaves, stems, crowns, flowers and soil (such as by shaking the plant or subjecting it to strong air currents), but is preferably after the removal of a large majority of leaves, stems, crowns, flowers and soil from the harvested plant matter. Chipping or chopping into pieces with an average size of 1.5" or less or 1" or less may be achieved using various physical means. One exemplary way of obtaining chopped plant matter with an average size of 1.5" or less or 1" or less is to feed raw plant material (or optionally rough chopped plant matter) into a shredder, a granulator, a hammer mill or a roller mill.

A granulator is a well-known machine designed for chopping or grinding material into various sizes. Most granulators contain multiple knives (often steel knives) and one or more screens (sometimes interchangeable) with various diameter holes to determine the size of the final product. Various size granulators exist and may be useful in chopping the plant matter such as those containing openings of $\frac{3}{8}$", $\frac{1}{4}$" and $\frac{1}{8}$".

A hammer mill can generally be described as a steel drum containing a vertical or horizontal rotating shaft or drum on which hammers are mounted along with a surrounding screen-like material on the outer surface; the hammers "pound" the material that is passed through the mill. The hammers are generally flat metal bars often with some type of hardface treatment on the working ends. The hammers may be fixed or swinging. Various size hammer mills exist and may be useful in chopping the TKS plant matter such as those containing screen openings of $\frac{3}{8}$", $\frac{1}{4}$", $\frac{3}{16}$" and $\frac{1}{8}$". As the chopped material passes through the screen openings, the size of the screen openings directly determines the final particle size of the hammer milled material.

A roller mill/cracker mill can generally be described as a device with two or more rolls each containing longitudinal grooves which assist in further size reduction of material fed through the mill. Various size roller mills exist and may be useful in chopping the TKS plant matter such as those containing openings of $\frac{3}{4}$", $\frac{1}{2}$", $\frac{3}{8}$", $\frac{1}{4}$" and $\frac{1}{8}$". In certain embodiments according to the first, second and third embodiments of the processes disclosed herein, the TKS plant matter is subjected to at least one of a shredder, a granulator, a hammer mill, a roller mill and a flaker mill to produce chopped plant matter having an average size of 1" or less (e.g., $\frac{1}{8}$" to 1" or $\frac{1}{8}$" to $\frac{1}{2}$"). In other embodiments according to the first, second and third embodiments of the processes disclosed herein, the TKS plant matter is subjected to at least two of a shredder, a granulator, a hammer mill, a roller mill and a flaker mill to produce chopped TKS plant matter having an average size of 1" or less (e.g., $\frac{1}{8}$" to 1" or $\frac{1}{8}$" to $\frac{1}{2}$"). In yet other embodiments according to the first, second and third embodiments of the processes disclosed herein, the TKS plant matter is subjected to shredding/ chopping, hammer milling, roller milling and a flaker mill. In certain embodiments of the processes according to the first, second, third, and fourth embodiments disclosed herein, the only mechanical particle size reduction to which the TKS plant matter is subjected is hammer milling; it is contemplated that the use of hammer milling alone may reduce the amount of undesirable fines present in the bagasse, leading to a lower ash content in the resulting rubber. In certain such embodiments, the TKS is maintained at a temperature of less than 80° C. within the hammer mill.

In certain embodiments of the processes disclosed herein, the TKS plant matter utilized in the slurry (or the source of the bagasse within the slurry) has not only been chopped or shredded (such as by treatment in a shredder, a roller mill, hammer mill and/or granulator) but has also been subjected to a flaker mill/flaker and/or other mechanical treatment capable of rupturing the cell walls of the cells that contain the natural rubber prior to mixing with organic solvents to form a slurry. A flaker mill or flaker can generally be described as a device with two or more rolls each having a smooth surface, usually operated at different speeds, with a defined and adjustable clearance between rolls which primarily assist in providing further rupturing of plant cell walls. Such types of mechanical treatment tend to increase the amount of natural rubber that can ultimately be recovered from the plant matter. In certain preferred embodiments of the processes disclosed herein utilizing plant matter from TKS, chopped TKS plant matter is subjected to both roll milling and flake milling. In those embodiments where at least one of roll milling, or hammer milling, a shredder, a granulator and flake milling is used upon the chopped TKS plant matter, the chopped TKS plant matter is preferably treated with at least one antioxidant if the material will be stored prior to preparing the slurry (the amount of the antioxidant being in accordance with the antioxidant discussion herein).

In certain embodiments of the processes disclosed herein, it can be helpful to treat the chopped TKS plant matter with an average size of 1.5" or less or 1" or less (such as exits a granulator) to remove undersize material. The amount of undersize material that is generated may vary depending upon various factors including the method used to chop or chip the TKS plant material and the speed at which the chopping or grinding takes place. One exemplary way of removing undersize material is to pass the chopped TKS plant matter over a mesh screen that is then vibrated to allow undersize material to fall through the mesh. Various types of mesh screen may be utilized, depending upon the size of material that is classified as "undersize." In certain embodiments, a 30 mesh, 25 mesh, 20 mesh, 18 mesh or 16 mesh screen is utilized. The mesh rating of the screen corresponds to the number of openings per square inch. Hence a 20 mesh screen will have 20 openings in one square inch. The sizes of the openings in the listed mesh screens are as follows: 30 mesh (0.0232" openings or 595 micron openings); 25 mesh (0.0280" openings or 707 micron openings); 20 mesh (0.0331" openings or 841 micron openings); 18 mesh (0.0394" openings or 1000 micron openings); and 16 mesh (0.0469" openings or 1190 micron openings). Another exemplary way to remove undersize material is by using an air separator which functions to blow away or out undersize (and hence lighter) particles. Preferably when undersize material is removed (such as by a mesh screen), at least 90% by weight, even more preferably at least 95% by weight of the undersize material is removed. In certain embodiments, the plant material that is used for the slurry has a size of 1/16" to 1.5", preferably 1/16 to 1", even more preferably 1/8" to 1/2"; in certain such embodiments the plant material has been subjected to a process such as granulation that utilizes a screen having opening of 1/16" 1/8", 1/4" or 1/2" thereby producing material having a maximum size of no bigger than the openings.

In certain embodiments of the first, second, and fourth processes disclosed herein, the slurry that is utilized contains 10-50 weight % TKS plant matter (based on the total weight of the slurry) with the remaining amount of the slurry comprising organic solvents. (Notably, as discussed previously, with respect to the third embodiment of the processes disclosed herein, the solution contains 5-20 weight % bagasse.) In addition to the 10-50 weight % TKS plant matter, the slurry also contains 0.5-10 weight % of water, the water being contributed to the slurry by the plant matter and included within the 10-50 weight % allotment of plant matter within the slurry. In other words, the 10-50 weight % plant matter of the slurry encompasses the water contained within in the slurry. In certain embodiments according to the first, second and fourth embodiments of the processes described herein, the slurry that is utilized contains 25-50 weight % TKS plant matter (based on the total weight of the slurry) with the remaining amount of the slurry comprising organic solvents.

As previously discussed, according to the first, second and fourth embodiments of the processes described herein, the TKS plant matter utilized in the slurry provides bagasse, rubber and resin. (Notably, in the third embodiment of the processes disclosed herein, the solubilized TKS rubber solution also contains bagasse, rubber and resin along with organic solvents.) The solubilized TKS rubber solution of the third embodiment has less bagasse (5-20%) as compared to certain of the other embodiments (10-50%) either because less plant matter has been added relative to the organic solvents or, more preferably, because some amount of bagasse has already been removed to create the solubilized TKS rubber solution.) The rubber and resin that are contained within the slurry are solubilized by the at least one non-polar organic solvent and at least one polar organic solvent, respectively. In certain embodiments according to the first, second and fourth embodiments of the processes described herein, the plant matter utilized in the slurry includes roots, leaves, stems, crowns, flowers, rubber and resin. In certain embodiments according to the first, second, and fourth embodiments of the processes described herein, roots comprise at least 80 weight %, at least 85 weight % or even at least 90 weight % of the plant matter and the remaining plant matter comprises leaves, stems, crowns, and flowers; in certain such embodiments, the roots comprise 80-100%, 80-99%, 80-95% or 90-100% or 90-99% of the plant matter that is utilized to prepare the slurry or within the briquettes. In order to achieve the foregoing make-up of plant matter it may be necessary to remove or limit the amount of leaves, stems and flowers that is utilized within the plant matter. These limitations as to the amount of plant matter used within the slurry apply to those embodiments of the first, second, and fourth embodiments of the processes described herein where the plant matter is from TKS. In order to achieve the foregoing make-up of plant matter it will likely be necessary to remove or limit the amount of leaves, stems, crowns, and flowers that is utilized within the plant matter that goes into the slurry. Each portion of the TKS plant matter (i.e., roots, leaves, crowns, flowers, and stems) will contain varying amounts of rubber, resin and water, with the roots having the highest rubber content (by weight percentage).

In certain embodiments, the slurry utilized in the first, second, and fourth embodiments of the processes described herein contains 0.5-10 weight % water. While the processes described herein are organic solvent based, some small residual amount of water (i.e., 0.5-10 weight %) may be present (primarily from residual water contained within the TKS plant matter, although a small amount may be contributed by residual water within the organic solvents). In certain embodiments according to the first, second, and fourth embodiments of the processes described herein, the slurry contains 0.5-7 weight % water, 0.5-5 weight % water or even 0.5-2 weight % water. In certain embodiments according to the first, second, and fourth embodiments of the processes described herein, the slurry contains no more than 4 weight % water, no more than 3 weight % water or even no more than 2 weight % water. In preferred embodiments of the first, second and fourth embodiments of the processes disclosed herein, the slurry preferably contains no bleaching agent, defoaming agent or organic protein-denaturing compound. In preferred embodiments of the third embodiment of the processes disclosed herein, the solubilized TKS rubber solution contains no bleaching agent, defoaming agent or organic protein-denaturing compound.

Utilization of Briquetted Plant Matter

The following description of briquetted plant matter should be understood to be applicable to not only the second embodiment of the processes disclosed herein but also to certain embodiments of the first, third and fourth embodiments of the processes disclosed herein (i.e., when the third embodiment utilizes plant matter in briquetted form to form the slurry).

Preparation of the Plant Matter for Briquettes

In certain embodiments of the processes disclosed herein, the briquettes are made from TKS plant matter that has been chopped or chopped into pieces with an average size of 1" or less. Generally, the chipping or chopping of the TKS plant matter to a size of 1.5" or less or 1" or less may take place in one or more than one step. For example, the TKS plant that is utilized may be rough chopped at the location of harvesting into pieces averaging less than 2" in length. Rough chopping may take place before or after the optional removal of leaves, stems, crowns, flowers, and soil (such as by shaking the plant or subjecting it to strong air currents), but is preferably after the removal of a large majority of leaves, stems, crowns, flowers, and soil from the harvested plant matter. Chipping or chopping into pieces with an average size of 1.5" or less or 1" or less may be achieved using various physical means. One exemplary way of obtaining chopped TKS plant matter with an average size of 1.5" or less or 1" or less is to feed raw plant material (or optionally rough chopped plant matter) into a shredder, a granulator, a hammer mill or a roller mill. A granulator is a well-known machine designed for chopping or grinding material into various sizes. Most granulators contain multiple knives (often steel knives) and one or more screens (sometimes interchangeable) with various diameter holes to determine the size of the final product. Various size granulators exist and may be useful in chopping the plant matter such as those containing openings of ⅜", ¼" and ⅛". A hammer mill can generally be described as a steel drum containing a vertical or horizontal rotating shaft or drum on which hammers are mounted; the hammers "pound" the material that is passed through the mill. Various size hammer mills exist and may be useful in chopping the plant matter such as those containing openings of ⅜", ¼" and ⅛". A roller mill/cracker mill can generally be described as a device with two or more rolls each containing longitudinal grooves which assist in further size reduction of material fed through the mill. Various size roller mills exist and may be useful in chopping the plant matter such as those containing openings of ⅜", ¼" and ⅛". In certain embodiments according to the first and second embodiments of the processes disclosed herein, the plant matter is subjected to at least one of a granulator, a shredder, a hammer mill, a roller mill and a flaker mill to produce chopped plant matter having an average size of 1" or less". In other embodiments according to the first and second embodiments of the processes disclosed herein, the plant matter is subjected to at least two of a shredder, a granulator, a hammer mill, a roller mill and a flaker mill to produce chopped plant matter having an average size of 1" or less.

In certain embodiments of the processes disclosed herein, the plant matter utilized in the briquettes has not only been chopped or shredded (such as by treatment in a shredder, a roller mill, hammer mill and/or granulator) but has also been subjected to a flaker mill/flaker and/or other mechanical treatment capable of rupturing the cell walls of the cells that contain the natural rubber after briquetting but prior to being mixed into the slurry. A flaker mill or flaker can generally be described as a device with two or more rolls each having a smooth surface, usually operated at different speeds, with a defined and adjustable clearance between rolls which primarily assist in providing further rupturing of plant cell walls. Such types of mechanical treatment tend to increase the amount of natural rubber that can ultimately be recovered from the plant matter. In certain preferred embodiments of the first and second embodiments of the processes disclosed herein utilizing plant matter from TKS, chopped plant matter is subjected to both roll milling and flake milling. In other embodiments, chipped plant matter from TKS is used for the briquettes, and the chopped plant matter is subjected to at least one of roll milling, a shredder, a granulator and hammer milling prior to compression into a briquette and flake milling after briquetting (during but before preparation of the slurry). In those embodiments where at least one of roll milling, or hammer milling, a shredder, a granulator and flake milling is used upon the chopped TKS plant matter, the chopped TKS plant matter is preferably treated with at least one antioxidant prior to being compressed into a briquette (the amount of the antioxidant being in accordance with the previous antioxidant discussion).

In certain embodiments according to the first and second embodiments of the processes disclosed herein, it can be helpful to treat the chopped TKS plant matter with an average size of 1.5" or less or 1" or less (such as exits a granulator) to remove undersize material before briquetting. The amount of undersize material that is generated may vary depending upon various factors including the method used to chop or chip the TKS plant material and the speed at which the chopping or grinding takes place. One exemplary way of removing undersize material is to pass the chopped TKS plant matter over a mesh screen that is then vibrated to allow undersize material to fall through the mesh. Various types of mesh screen may be utilized, depending upon the size of material that is classified as "undersize." In certain embodiments, a 30 mesh, 25 mesh, 20 mesh, 18 mesh or 16 mesh screen is utilized. The mesh rating of the screen corresponds to the number of openings per square inch. Hence a 20 mesh screen will have 20 openings in one square inch. The sizes of the openings in the listed mesh screens are as follows: 30 mesh (0.0232" openings or 595 micron openings); 25 mesh (0.0280" openings or 707 micron openings); 20 mesh (0.0331" openings or 841 micron openings); 18 mesh (0.0394" openings or 1000 micron openings); and 16 mesh (0.0469" openings or 1190 micron openings). Another exemplary way to remove undersize material is by using an air separator which functions to blow away or out undersize (and hence lighter) particles. Preferably when undersize material is removed (such as by a mesh screen), at least 90% by weight, even more preferably at least 95% by weight of the undersize material is removed. In certain embodiments, the TKS plant material that is formed into briquettes has a size of 1/16" to 1.5", preferably 1/16 to 1", even more preferably 1/8" to 1/2"; in certain such embodiments the TKS plant material has been subjected to a process such as granulation that utilizes a screen having opening of 1/16" 1/8", 1/4" or 1/2" thereby producing material having a maximum size of no bigger than the openings.

In certain embodiments, the TKS plant matter that is compressed into the briquettes has not only been chipped but has also been subjected to a roller mill/cracker mill, flaker mill/flaker, hammer mill and/or other mechanical treatment capable of rupturing the cell walls of the cells that contain the natural rubber. A roller mill/cracker mill can generally be described as a device with two or more rolls each containing longitudinal grooves which assist in further size reduction of material fed through the mill. A flaker mill or flaker can generally be described as a device with two or more rolls each having a smooth surface, usually operated at different speeds, with a defined and adjustable clearance between rolls which primarily assist in providing further rupturing of plant cell walls. A hammer mill can generally be described as a steel drum containing a vertical or horizontal rotating shaft or drum on which hammers are mounted; the hammers "pound" the material that is passed through the mill. Such types of mechanical treatment tend to increase the amount of natural rubber that can ultimately be recovered from the TKS plant matter. In certain embodiments, chipped plant matter from TKS is used for the briquettes, and the chipped TKS plant matter is subjected to at least one of roll milling, flake milling and hammer milling prior to compression into a briquette. In those embodiments where at least one of roll milling, flake milling or hammer milling is used upon the chipped plant matter, the chipped TKS plant matter is preferably treated with at least one antioxidant prior to being compressed into a briquette (the amount of the antioxidant being in accordance with the antioxidant discussion herein).

The briquettes that are used in the embodiments described herein may contain a certain amount of water. In certain embodiments, the briquettes contain 2-20% by weight water (based upon the total weight of the briquette). In other embodiments the briquettes contain 5-15% by weight water. The water that is within the briquettes has as its primary source residual water from the plant matter. The amount of water present in the briquettes can be adjusted such as by drying the chipped TKS plant matter prior to compacting it into briquettes. In certain embodiments of the first and second embodiments described herein, the chipped TKS plant matter is dried to reduce its moisture content by at least 2 weight %, by at least 4 weight % or even by at least 6 weight % prior to compacting the TKS plant matter into briquettes. Various methods of achieving drying of the chopped TKS plant matter can be utilized, including, but not limited to, sun drying, forced air drying (with air that is dry and/or heated). In certain embodiments, the TKS plant matter may be dried prior to chipping. Another potential source for the water that may be present in the briquettes is additives added to the TKS plant matter after harvest. As discussed in more detail later, these additives can include antioxidants and/or binders that may optionally be applied via aqueous solutions of the active ingredients.

When the embodiments disclosed herein make use of briquettes made of plant matter from TKS, the plant matter that is utilized may take various forms as described further herein. In certain embodiments, the plant matter comprises chopped TKS including roots, crowns, stems, flowers and leaves but with no more than 5 weight %, preferably no more than 4 weight % or no more than 3 weight % or even more preferably no more than 1 weight % of the plant matter comprising leaves, stems, crowns, and flowers from the TKS plants. In certain of the foregoing embodiments, the TKS used for the plant matter initially comprises both the above-ground portions and below-ground portions of the plant (i.e., the stems, crowns, flowers, and leaves and also the roots). In other of the foregoing embodiments, the TKS used for the plant matter initially comprises only the below-ground portions of the plant (in other words, only the roots are included in the plant matter). The leaves, crowns, flowers, and stems of TKS may be removed using various methods such as field drying followed by shaking or cutting, simply cutting upon harvest or by harvest method (e.g., harvesting when the above-ground portions of the plant have seasonly died off). Other methods for removing the leaves from the plant matter of TKS before incorporating that plant matter into briquettes may occur to those of skill in the art and may be utilized as the particular method for removing leaves is not considered to be a significant limitation of the processes disclosed herein.

In certain embodiments, the plant matter utilized in the briquettes contains bagasse, rubber and resin. In certain embodiments, the plant matter utilized in the briquettes includes bark, woody material, rubber and resin. In certain embodiments, roots comprise at least 70 weight %, 80 weight %, at least 85 weight % or even at least 90 weight % of the briquette and the remaining amount of the briquette comprises leaves, crowns, flowers, and stems. In order to achieve the foregoing make-up of plant matter within the briquette it may be necessary to remove or limit the amount of leaves, crowns, flowers, and stems that is utilized within the plant matter and compacted into briquettes. Each portion of the plant matter (i.e., bark, woody material and leaves) used within the briquettes will contain varying amounts of bagasse, rubber, resin and water.

Briquetting

As previously discussed, certain embodiments disclosed herein make use of compressed TKS plant matter in the form of briquettes. The term briquette is meant to encompass various forms or shapes, including, but not limited to, pellets, cubes, rectangular solids, spherical solids, egg-shaped solids, bricks and cakes. Various methods exist for compacting the TKS plant matter into briquettes. One method of preparing briquettes from the plant matter is to utilize a commercial briquetting machine to prepare the briquettes. Various companies manufacture these machines and they are available in various sizes and specifications. Exemplary briquetting machines include those manufactured by K.R. Komarek, Inc. (Wood Dale, Ill.), including the roll-type briquetting machines model no. B 100R and BR200QC. Generally, a briquetting machine utilizes a roll-type system to compact material, with or without the addition of a binder to the material that is being compressed. Pressure can be applied by the machine in varying amounts depending upon the machine utilized, the properties of the chipped plant matter and the properties desired in the briquettes. In certain embodiments, briquettes of plant matter from TKS are made using a briquetting machine. In certain of the foregoing embodiments, a binder is applied to the chipped plant matter prior to its being compressed into briquettes. Other methods of preparing briquettes of chipped plant matter from TKS may occur to those of skill in the art and may be utilized within the scope of the processes disclosed herein.

In certain embodiments, the briquettes are made from chipped TKS plant matter that has been treated with one or more binders prior to compression into briquettes. Various types of binders may be utilized, including, but not limited to, organic-based binders (such as wood products, clay, starches and ash), chemical-based binders (such as—sulfonate, lime, and sodiumbentonite and liquids such as water. The amount of binder utilized with the chipped TKS plant matter may vary depending upon the type of briquette being formed. In certain embodiments, the amount of binder utilized with the briquette 0.1-5 weight % (based on the total weight of the briquette).

In certain embodiments, the briquettes are made from chipped TKS plant matter that has been treated with one or more antioxidants prior to compression into briquettes. Suitable compounds for use as the one or more antioxidants in certain embodiments according to the first and second embodiments disclosed herein are well known to those skilled in the art and include, but are not limited to, 2,6-di-t-butyl-4-methylphenol (also known as 2,6-di-t-butyl-p-cresol); N-(1,3-dimethylbutyl)-N'-phenyl-1,4-benzenediamine; octadecyl-3-(3,5-di-tert.butyl-4-hydroxyphenyl)-propionate (commercially available as Irganox® 1076); 4,6-bis (octylthiomethyl)-o-cresol (commercially available as Irganox® 1520), monohydric hindered phenols such as 6-t-butyl-2,4-xylenol, styrenated phenols, butylated octylphenols; bisphends, for example 4,4'-butylidenebis(6-t-butyl-m-cresol), polybutylated bisphenol A, hindered hydroquinones such as 2,4-di-t-amylhydroquinone; polyphenols, such as butylated p-cresol-dicyclopentadiene copolymer; phenolic sulfides such as 4,4'-thiobis(6-t-butyl-3-methylphenol), alkylated-arylated bisphenol phosphites such as tris(nonylphenyl)phosphite, triazinetriones such as alkylated hydroxycinnamate triester of tris(2-hydroxyethyl)-triazinetrione, tris(alkyhydroxybenzyl)-triazinetrione; pentaerythritol esters such as tetrakis(methylene-3,5-di-t-butyl-4-hydroxyhydrocinnamate)-methane; substituted diphenylamines such as octylated diphenylamines, p-(p-touenesulfonamido)-di-phenylamine, nonylated diphenylamine, diisobutylene-diphenylamine reaction products; dihydroquinolines such as 6-dodecyl-1,2-dihydro-2,2,4-trimethylquinoline; dihydroquinoline polymers such as 1,2-dihydro-2,2,4-trimethylquinoline polymer; mercaptobenzimidazoles such as 2-mercaptobenzimidazole; metal dithiocarbamates such as nickel dibutyldithiocarbamate, nickel diisobutyldithiocarbamate, nickel dimethyldithiocarbamate; ketone/aldehyde-arylamine reaction products such as aniline-butyraldehyde condensation products, diarylamine-ketone-aldehyde reaction products; and substituted p-phenylenediamines such as di-b-naphthyl-p-phenylenephenylenediamine and N-phenyl-N'-cyclohexyl-p-phenylenediamine. The total amount of the antioxidant employed in those embodiments according to the first and second embodiments disclosed herein that utilize at least one antioxidant may be in the range of 0.2% to 2% by weight of the purified solid rubber ultimately produced by the process (based upon the weight of the purified solid rubber containing 0.8 weight % volatile matter).

In certain embodiments, the briquettes are capable of being stored for at least 90 days after compacting while still having the rubber contained within the briquettes retain a molecular weight of at least 800,000, preferably at least 1,000,000. In certain preferred embodiments, the briquettes are made of chipped plant matter from TKS and the briquettes are capable of being stored for at least 90 days after compacting while still having the rubber contained within the briquettes retain a molecular weight of at least 800,000, preferably at least 1,000,000. In other embodiments, the briquettes are capable of being stored for at least 7 months (210 days) after compacting while still having the rubber contained within the briquettes retain a molecular weight of at least 800,000, preferably at least 1,000,000. In certain preferred embodiments, the briquettes are made of chipped plant matter from TKS and the briquettes are capable of being stored for at least 7 months (210 days) after compacting while still having the rubber contained within the briquettes retain a molecular weight of at least 800,000, preferably at least 1,000,000.

Preparation of the Slurry

Depending upon how the initial slurry (containing plant matter from TKS, at least one polar organic solvent and at least one non-polar organic solvent) has been prepared or processed, in certain embodiments of the first, second, third, and fourth embodiments of the processes disclosed herein, the overall extraction of rubber from the TKS plant matter may be enhanced by ensuring that the TKS plant matter is not only thoroughly contacted with the solvents but also by agitating or mixing the combination of TKS plant matter and solvents. Various methods of mixing and/or applying agitation to the combination of TKS plant matter and solvents may be utilized, including, but not limited to mixing in an agitated tank, homogenizing, dispersing and wet-milling. In certain such embodiments, one or more tanks or reactors may be utilized to apply mixing and/or agitation to the slurry or to the combination of TKS plant matter and solvents either prior to utilizing the slurry or at least prior removing the majority of the bagasse from the slurry to produce a miscella. As those skilled in the art will appreciate, the extent of mixing and/or agitation will vary depending upon factors such as the size and concentration of the slurry or combination of plant matter and solvents, the size and power of the equipment being utilized for the mixing and/or agitation. In certain embodiments of the processes disclosed herein, the TKS plant matter and the organic solvents (i.e., the at least one polar organic solvent and the at least one non-polar organic solvent) are allowed to remain in contact for a certain period of time prior to removing the bagasse portion of the plant matter from the organic solvent portion that contains solubilized rubber and resin. In certain embodiments, this period of time is 0.3-3 hours and in other embodiments 0.5-1.5 hours. In other embodiments, a longer period of contact is allowed such as 1-8 hours or more.

Removal of Bagasse from the Slurry

The following descriptions of the removal of bagasse from the slurry should be understood to apply generally to the first, second and fourth embodiments of the processes disclosed herein which each of which specify removal of bagasse from a slurry to form a miscella. It should also be understood to be applicable to certain embodiments of the third embodiment of processes disclosed herein, wherein further steps are utilized such as to prepare the solubilized TKS rubber solution from a slurry. As discussed above, according to the processes disclosed herein, a majority of the bagasse is initially removed from the slurry to produce a miscella. (Weight percentages of bagasse referred to herein are based upon dry weights of bagasse (i.e., with any organic solvents and water having been removed). As discussed further below, the majority of the bagasse that is initially removed is in certain embodiments is 60-95 weight % of the bagasse contained within in the slurry, and in other embodiments 51-60 weight %, 60-80 weight %, 70-95 weight % or 75-95 weight %. The total amount of bagasse present in the slurry may be determined by taking a representative sample of the slurry—taking care to ensure there is no settling of the bagasse within the slurry prior to taking the sample—and extracting the insoluble materials by repeated rinsing and centrifuging. In other words, repeated rinsing and centrifuging of sediment followed by repeated centrifuging of each resulting supernatant to ensure complete removal of the insoluble bagasse materials. Three or more rounds of rinsing and centrifuging may be necessary. After condensing and drying of insoluble materials to remove organic solvents, the total weight of the insoluble materials can be determined. The amount of bagasse present in the sample can be calculated and by extension the total weight of bagasse present in the entire slurry can be calculated.) The miscella contains a certain amount of bagasse (i.e., the portion not removed from the slurry), solubilized rubber, solubilized resin, at least one polar organic solvent and at least one non-polar organic solvent. In certain embodiments of the processes disclosed herein, 60-95 weight % of the bagasse, 60-80 weight %, 70-95 weight % or 75-95 weight % of the bagasse is removed from the slurry to form the miscella. In certain preferred embodiments of the processes disclosed herein, at least 70 weight % or at least 75 weight % of the bagasse is removed from the slurry to form the miscella.

This removal of the bagasse from the slurry take may place by utilizing various equipment and/or processes and/or chemicals. The bagasse portion that is removed from the slurry is referred to herein as a first bagasse portion. In certain preferred embodiments of the processes disclosed herein, the removing of the bagasse from the slurry to produce a miscella is accomplished by using a centrifuge, optionally a decanter centrifuge. In other embodiments of the processes disclosed herein, the removing of the bagasse from the slurry to produce a miscella is accomplished using an extraction decanter or a screw press. In yet other embodiments of the processes disclosed herein, the removing of the bagasse from the slurry to produce a miscella is accomplished using a counter-current extractor. While the following particular descriptions of the bagasse from the slurry are explained with respect to the second embodiment of the processes disclosed herein, it should be understood that each type of equipment described can also be utilized to remove bagasse from the slurry in certain embodiments of the first embodiment of the processes disclosed herein. Furthermore, the detailed description of the operation of a decanter centrifuge should be considered to be applicable to certain embodiments of the fourth embodiment of the processes disclosed herein. In certain embodiments of the processes disclosed herein, a portion or all of the first bagasse portion is fed back into the slurry so as to allow for transfer of additional solubilized rubber or resin that is associated with the solvent-wet bagasse into the liquid portion of the slurry (i.e., the miscella). In other embodiments of the processes disclosed herein, none of the first bagasse portion is fed back into the slurry. In certain embodiments of the processes disclosed herein, at least a portion of the miscella (containing solvents, rubber, resin and bagasse) that is produced from the slurry is fed back into the slurry. In other embodiments of the processes disclosed herein, none of the miscella is fed back into the slurry.

In certain embodiments, when a decanter centrifuge is utilized to remove bagasse from the slurry, it is operated at a speed sufficient to generate a g force of 500 to 3,500, preferably 1,000 to 3,000 or 1,000 to 2,500. (As those skilled in the art will understand g force is a measure of the amount of acceleration applied to a sample and is a function of rotations per minute and rotation radius.) It is also within the scope of the processes described herein to utilize more than one centrifuge to remove the majority of the bagasse from the slurry. In certain embodiments of the processes described herein, the solids content of the miscella that is produced by removing bagasse from the slurry is 5-20 weight %, preferably 7-18 weight % (based upon the total weight of the miscella), with solids being considered bagasse, rubber and resin. In certain embodiments according to the processes described herein, the miscella contains 1-10 weight % rubber and 1-10 weight % resin; in other embodiments the miscella contains 3-7 weight % rubber and 3-9 weight % resin.

As previously discussed, in certain particular embodiments of the first embodiment of the processes disclosed herein, the slurry is subjected to a centrifuging process in order to remove 70-95 weight % bagasse (based on the total weight of bagasse in the slurry) to produce a miscella. The miscella contains bagasse, solubilized rubber, solubilized resin, at least one polar organic solvent and at least one non-polar organic solvent. In certain embodiments, the slurry is subjected to a centrifuging process in order to remove at least 75 weight % bagasse; in certain such embodiments, 75-95 weight % of the bagasse. In certain embodiments, the centrifuge is a decanter centrifuge, and in certain such embodiments it is operated at a speed sufficient to generate 500-3,500 g, preferably 1,000 to 3,000 g. It is also within the scope of the processes described herein to utilize more than one centrifuge to remove at least 70 weight % (e.g., 70-95 weight %) or at least 75 weight % (e.g., 75-95 weight %) bagasse from the slurry. In certain embodiments of the processes described herein, the solids content of the miscella that is produced by removing bagasse from the slurry is 5-20 weight %, preferably 7-18 weight % (based upon the total weight of the miscella), with solids being considered bagasse, resin and rubber. In certain embodiments of the processes disclosed herein, the miscella contains 1-10 weight % rubber and 1-10 weight % resin or; in other embodiments of the processes described herein, the miscella contains 3-7 weight % rubber and 3-9 weight % resin.

As previously discussed, in certain particular embodiments of the first embodiment of the processes disclosed herein the slurry is subjected to an extraction process in order to remove 60-95% by weight bagasse (based on the total weight of bagasse present in the slurry), thereby producing a miscella. The extraction process may involve the use of an extraction decanter. An extraction decanter can be a scroll-type centrifuge (often horizontal) with a cylindrical conical solid-wall bowl. A scroll that is adapted to the bowl wall is located within the bowl and rotates therein. The suspension or slurry to be extracted is fed into the machine (often via distributor slots in the scroll of the bowl). The slurry or suspension then enters the counter-current extraction zone of the bowl and flows to the conical end of the bowl via a separating disc against the flow of an extraction agent that is added (i.e., counter-current effect). The use of certain extraction decanters can allow for the addition of additional solvent during the extraction process and may be operated in a continuous or semi-continuous manner. Various types of extraction decanters exist, including those that employ counter-current extractions, scroll-type decanters and screen bowl type and solid bowl type. Preferably, the extraction decanter utilized is a counter-current extractor. As used herein, the phrase extraction decanter should be understood to include various types of extraction decanters including counter-current extractors, scroll-type decanters, screen bowl type and solid bowl typ. In certain embodiments according to the third embodiment of the processes disclosed herein, the slurry is subjected to an extraction process sufficient to remove at least 70 weight % bagasse. In certain embodiments according to the third embodiment, the extraction process consists of an extraction decanter. An extraction decanter can be operated at various settings, depending upon the size and parameters of the particular machine and the amount of bagasse that is to be removed. It is also within the scope of the third embodiment of the processes described herein to utilize more than one extraction decanter to remove at least 70 weight % or at least 75 weight % bagasse from the slurry. In certain embodiments according to the third embodiment of the processes described herein, the solids content of the miscella that exits the extraction decanter is 5-20 weight %, preferably 7-18 weight % (based upon the total weight of the miscella), with solids being considered bagasse, resin and rubber. In certain embodiments according to the third embodiment of the processes described herein, the miscella that exits the extraction decanter contains 1-10 weight % rubber and 1-10 weight % resin. In other embodiments according to the third embodiment of the processes described herein, the miscella contains 3-7 weight % rubber and 3-9 weight % resin. In certain embodiments according to the third embodiment of the processes disclosed herein where an extraction decanter is utilized and where it is desired to reduce the viscosity of the miscella, it will be possible to add part or all of the additional solvent (i.e., polar organic solvent, non-polar organic solvent or a combination thereof) directly to the extraction decanter so as to reduce the viscosity of the miscella exiting the extraction decanter to less than 300 centipoise or less than 200 centipoise. It is also specifically contemplated that the extraction process step (e.g., using an extraction decanter) with its removal of a portion of the bagasse contained within the slurry may be used in combination with the addition of additional solvent (i.e., polar organic solvent, non-polar organic solvent or a combination thereof) so as to provide a modified miscella that contains relatively less bagasse and, thus, has a solids content that is appropriate for processing via the next bagasse removal step (which, in certain embodiments, entails the use of a disc centrifuge). It should be appreciated that when the solids content of the material entering the disc centrifuge is relatively lower (e.g., in the range of 5-10 weight %), a relatively smaller disc centrifuge may be utilized.

As previously discussed, in certain particular embodiments of the first embodiment of the processes disclosed herein, the slurry is subjected to a pressing process in order to remove at least 60% by weight bagasse (based on the total weight of bagasse present in the slurry), thereby producing a miscella. The pressing process may involve the use of a screw press. A screw press is a type of machine that contains a screw within a chamber the length of which is surrounded by cylindrical screen-like material. The screw is caused to turn which causes the material within the chamber to press through the chamber and up against the screen. The shaft of the screw may be larger in diameter towards the far end of the shaft so that the increasing diameter pushes the solid material toward the screen whereby liquid is expelled through the screen. Solid material is generally pushed along by the screw and may be pressed against the screen but does not pass through. As the screw continues to turn, a collection of solid material forms at the far end of the chamber. This solid material is often referred to as a press cake. At the far end of the chamber a plug or door is located (the plug or door is often called a cone). The cone is usually held shut by air pressure and the higher the air pressure, the harder the screw must push against the press cake to open and the more liquid that is expelled from the press cake. Most screw presses can be operated in a continuous fashion. In certain embodiments of the processes disclosed herein, the slurry is subjected to a pressing process sufficient to remove at least 70 weight % bagasse. In certain embodiments, the pressing process is accomplished by a screw press. In embodiments where a screw press is utilized, it is can be operated at various conditions depending upon the size and operating parameters of the particular screw press utilized. Various commercially available screw presses exist, including, but not limited to, those sold by Vincent Corporation (Tampa, Fla.).

In certain embodiments of the processes disclosed herein where a screw press is utilized it is operated at an rpm setting of 20-100 rpm, and at a back pressure of 5-15 psi (preferably 5-10 psi). It is also within the scope of the processes described herein to utilize more than one screw press or pass the bagasse through the screw press more than once (with addition of additional co-solvent to the bagasse press cake prior to any second pressing) to remove at least 70 weight % or at least 75 weight % bagasse from the slurry. In certain embodiments of the processes described herein, the solids content of the miscella that exits the press is 5-20 weight %, preferably 5-10 weight % (based upon the total weight of the miscella), with solids being considered bagasse, resin and rubber. In certain embodiments of the processes described herein, the miscella (liquor) that exits the press contains 1-10 weight % rubber and 1-10 weight % resin; in other embodiments, the miscella contains 3-7 weight % rubber and 3-9 weight % resin.

In certain embodiments of the processes disclosed herein, the removal bagasse from the slurry to produce a miscella is achieved by the use of a counter-current extractor. In certain embodiments, the bagasse removed by the counter-current extractor comprises 60-95% by weight of the bagasse that is contained within the slurry; in other embodiments 70-95% or even 75-95%. In certain embodiments utilizing the counter-current extractor, the bagasse and solvents mixture (i.e., the slurry) is mixed within a separate extractor for a period of time prior to use of the counter-current extractor, allowing for additional time for the solvent to contact the plant matter and solubilize the rubber and resins contained within the broken cells of the plant matter. In other embodiments, the bagasse and solvents mixture (i.e., the slurry) is not pre-mixed prior to being added to the counter-current extractor or is only pre-mixed just prior to being added to the counter-current extractor. A counter-current extractor works by the general principle of circulating or moving solids in one direction, while circulating or moving liquid (e.g., solvents) in the opposite direction, thereby increasing the amount of contact between solids and liquid. Various particular configurations of counter-current extractors are available and suitable for use in the processes disclosed herein.

In certain embodiments where a counter-current extractor is utilized, the plant matter that is mixed with the solvents to form the slurry is allowed to remain in contact with the solvents for a sufficient period of time to allow solubilization of the rubber and resin that is contained within the broken plant cells of the TKS plant matter, prior to removing the majority of the bagasse from the counter-current extractor. In certain such embodiments, the TKS plant matter is allowed to remain in contact with the solvents for 0.3-3 hours prior to removing the majority of the bagasse from the counter-current extractor; in other embodiments 0.5 hours-1.5 hours. It should be understood that the plant matter may be allowed to remain in contact with the solvents for longer period of time such as 1-8 hours or 3-8 hours prior to removing the majority of bagasse from the counter-current extractor. The contact periods of time referred to include both the (average) time that the plant matter is in contact with the solvents in the counter-current extractor, as well as any time that the TKS plant matter is in contact with the solvents in the separate extractor, if such separate extractor is utilized.

In certain embodiments where a counter-current extractor is utilized, the counter-current extractor is configured such that it contains multiple levels or stages with each level or stage containing bagasse that has been subjected to the solvents for varying and increasing amounts of time. Within these stages, the bagasse is moved through the counter-current extractor by a conveyor belt, screw or another type of conveying apparatus. At what can be considered the final level or stage which is where the bagasse has been in contact with the solvent for the longest period of time, the bagasse is removed from the counter-current extractor (such as by the use of a screw, a conveyor belt or another type of conveying apparatus). In certain embodiments, the bagasse that is being removed from the counter-current extractor is subjected to rinsing with fresh solvent (i.e., the mixture of non-polar organic solvent and polar organic solvent) in order to remove at least part of the rubber that may be solubilized but is associated with the solvent-wet bagasse.

In certain embodiments where a counter-current extractor is utilized, the bagasse that is removed from the counter-current extractor contains both bagasse and solvent mixture in relative amounts of 40-80% by weight solvent; in other embodiments, the bagasse that is removed contains 40-60% by weight solvent or 40-50% by weight solvent. In certain embodiments where a counter-current extractor is utilized, the bagasse that is removed from the counter-current extractor is pressed or squeezed to remove additional solvent. This squeezing or pressing may be employed by one or more methods including, but not limited to, a screw press, tray drier, extrusion, devolatilization, etc.

Adding Additional Organic Solvents

The following discussion should be understood as generally applicable to the first and second embodiments of the processes disclosed herein. Additionally, in may be useful in certain embodiments of the third and fourth embodiments of the processes disclosed herein to utilize additional organic solvents, and, thus, the discussion may also be considered applicable to those embodiments. As previously discussed, in certain embodiments of the processes disclosed herein, additional polar organic solvent, non-polar organic solvent or a combination thereof (each of which may be the same or different than the solvents present in the slurry) is added to the miscella to form a reduced viscosity miscella. The reduced viscosity miscella contains bagasse, solubilized rubber and resin as well as organic solvents. In certain preferred embodiments, any additional organic solvent(s) added is(are) the same as those contained within the slurry in order to simplify the process. The amount of any additional polar organic solvent that is added is less than the amount that causes the rubber contained within the reduced viscosity miscella to coagulate as the rubber should remain solubilized within the reduced viscosity miscella. As those skilled in the art will appreciate, the particular amount of any additional solvent(s) added will depend upon the volume of the miscella and the relative amounts of polar and non-polar organic solvents contained within the miscella as well as the particular subsequent processing to be performed upon the miscella to remove additional bagasse. In certain embodiments of the processes disclosed herein, the amount of additional solvent(s) added is an amount sufficient to produce a reduced viscosity miscella with a viscosity of less than 300 centipoise (e.g., 10-300 centipoise) and in other embodiments less than 200 centipoise (e.g., 10-200 centipoise). In certain embodiments, the step of adding additional polar organic solvent, additional non-polar organic solvent or a combination thereof is performed within the previous bagasse removal step and the viscosity of the miscella is such that it does not require further reduction. The general purpose behind reducing the viscosity of the miscella is to make it easier to remove smaller bagasse (e.g., fine bagasse finer than 105 microns and fine bagasse larger than 45 microns) in the subsequent steps of the process. As those skilled in the art will understand, the amount to which the viscosity of the reduced viscosity miscella is reduced (and accordingly, the amount of any additional organic solvent(s) added) will to a large extent be dictated by the parameters of the remaining steps of the process, including particularly the speed and/or number of steps by which smaller bagasse are removed to ultimately produce the coagulated rubber and solid purified rubber therefrom.

In certain embodiments of the processes described herein, the solids content of the reduced viscosity miscella or of the miscella/liquid material entering the next bagasse removal process is 2-18 weight %, preferably 5-15 weight % (based upon the total weight of the reduced viscosity miscella or of the miscella/liquid material), with solids including bagasse, rubber and resin. In certain embodiments according to the first embodiment of the processes described herein, the reduced viscosity miscella (or the miscella) contains 0.5-7 weight % rubber and 0.5-8 weight % resin (based upon the total weight of the reduced viscosity miscella or the miscella).

As previously discussed, in certain embodiments of the processes disclosed herein, additional polar organic solvent, non-polar organic solvent or a combination thereof (each of which may be the same or different than the organic solvents present in the slurry) is added to the miscella to form a reduced viscosity miscella with a viscosity lower than 200 centipoise (e.g., 10-200 centipoise). In other embodiments, additional polar organic solvent, non-polar organic solvent or a combination thereof is added to the miscella to form a reduced viscosity miscella with a viscosity lower than 300 centipoise (e.g., 10-300 centipoise). One or more than one organic solvent may be added. One or more than one polar organic solvent may be added. One or more than one non-polar organic solvent may be added. The reduced viscosity miscella contains bagasse, solubilized rubber and resin as well as organic solvents. In certain preferred embodiments, additional polar organic solvent is added to the miscella to form the reduced viscosity miscella. In certain preferred embodiments, any additional polar organic solvent is added that is the same as the at least one polar organic solvent contained within the slurry in order to simplify the process. The amount of any additional polar organic solvent that is added is less than the amount that causes the rubber contained within the reduced viscosity miscella to coagulate as the rubber should remain solubilized within the reduced viscosity miscella. As those skilled in the art will appreciate, the particular amount of additional organic solvent(s) added will depend upon the volume of the miscella and the relative amounts of polar and non-polar organic solvents contained within the miscella. The general purpose behind reducing the viscosity of the miscella is to make it easier to remove smaller bagasse (e.g., fine bagasse finer than 105 microns and fine bagasse larger than 45 microns) in the subsequent steps of the process. As those skilled in the art will understand, the amount to which the viscosity of the reduced viscosity miscella is reduced (and accordingly, the amount of additional organic solvent(s) added) will to a large extent be dictated by the parameters of the remaining steps of the process, including particularly the speed and/or number of steps by which smaller bagasse are removed to ultimately produce the coagulated rubber and solid purified rubber therefrom. In certain embodiments according to the second embodiment of the processes described herein, the solids content of the reduced viscosity miscella or of the liquid material entering the next bagasse removal process is 2-18 weight %, preferably 5-15 weight % (based upon the total weight of the reduced viscosity miscella), with solids including bagasse, rubber and resin. In certain embodiments according to the second embodiment of the processes described herein, the reduced viscosity miscella contains 0.5-7 weight % rubber and 0.5-8 weight % resin (based upon the total weight of the reduced viscosity miscella).

Second Removal of Bagasse

As should be clear from the previous discussion of the processes according to the first and second embodiments disclosed herein, after the miscella is produced by removing a majority of the bagasse from the slurry, additional bagasse remains within the miscella, a portion of which must be removed in order to produce a commercially acceptable final rubber product. As previously discussed, in the first and second embodiments of the processes disclosed herein, 80-95 weight % bagasse (based on the total weight of bagasse present in the reduced viscosity miscella or the miscella from which a majority of bagasse has been removed) is removed from the reduced viscosity miscella or from the miscella to form a purified miscella. A majority of the bagasse that is removed to form the purified miscella has a particle size less than 105 microns. (In other words, at least 50% by weight of the bagasse that is removed has a particle size less than 105 microns and in certain embodiments at least 90% or 95% by weight of the bagasse that is removed has a particle size less than 105 microns. The particle size range of the bagasse that is removed can be determined by drying the bagasse to remove organic solvents and then subjecting the dried mass to particle size analysis such as by sieve analysis. Various methods for particle size analysis are well known to those skilled in the art.) The purified miscella contains solubilized rubber and resin as well as organic solvents. In certain embodiments of the processes according to the first and second embodiments disclosed herein, at least 85 weight % (e.g., 85-95 weight %) or at least 90 weight % (e.g., 90-95 weight %) bagasse is removed to form the to form a purified miscella. In certain preferred embodiments according to the first and third embodiments of the processes disclosed herein, the removing of additional bagasse to produce the further purified miscella is accomplished by using a centrifuge, optionally a disk centrifuge. In certain such embodiments when a disk centrifuge is utilized, it is operated at a speed sufficient to generate a g force of 4,000 to 12,000, preferably 7,000 to 10,000. It is also within the scope of certain embodiments of the first and second embodiments of the processes described herein to utilize more than one centrifuge or more than one treatment method to remove the additional bagasse to produce the purified miscella. In certain embodiments of the processes according to the first and second embodiments described herein, the solids content of the purified miscella is 2-16 weight %, preferably 3-12 weight % (based upon the total weight of the purified miscella), solids including rubber, resin and bagasse. In certain embodiments according to the processes of the first and second embodiments described herein, the purified miscella contains 0.5-7 weight % rubber and 0.5-8 weight % resin (based upon the total weight of the purified miscella).

Further Purification of the Purified Miscella

As previously discussed, optionally in certain embodiments of the processes according to the first and second embodiments disclosed herein, the purified miscella is treated to remove additional bagasse thereby producing a clarified rubber solution that contains 0.01-1% bagasse (based on the total weight of bagasse present in the slurry). In certain such embodiments, 0.01-0.5% bagasse or even 0.01-0.1% bagasse (based on the total weight of bagasse present in the slurry) remains in the clarified rubber solution. 90-99% (by weight) of the additional bagasse that is removed (from the purified miscella) has a particle size greater than 45 microns and in other embodiments, 95-99% by weight of the additional bagasse that is removed has a particle size greater than 45 microns. The clarified rubber solution contains solubilized rubber and solubilized resin (from the plant matter) as well as polar and non-polar organic solvent. In certain preferred embodiments, the removing of additional bagasse from the purified miscella is accomplished by filtering, optionally by the use of a screen-bar element type-filter containing openings of 45 microns or less, continuously scraped by a rotating blade. Screen-bar element type filters are characterized by a screen filter with opening of a specified size through which fluid is passed. Solids larger than the openings are caught by the screen filter and removed from the screen filter by scraping such as by a rotating blade. The solids can then fall to the bottom of the filter apparatus where they can be collected and/or discharged periodically. Other processes, including, but not limited to other filtering methods, may be used to remove additional bagasse from the purified miscella to produce a clarified rubber solution that contains 0.01-1% bagasse (based on the total weight of bagasse present in the slurry). It is also within the scope of the processes described herein to utilize more than one filter or more than one treatment method to remove the additional bagasse thereby producing a clarified rubber solution that contains 0.01-1% bagasse (based on the total weight of bagasse present in the slurry).

Organic Solvents

In any of the embodiments of the processes according to the first, second, third and fourth embodiments disclosed herein, the organic solvents contained within the slurry (or within the solubilized TKS rubber solution of the third embodiment) and any additional organic solvents (polar organic solvent, non-polar organic solvent, or a combination thereof) added to the miscella to form a reduced viscosity miscella or elsewhere in the process may be the same or different (i.e., overall one non-polar organic solvent may be utilized and overall one polar organic solvent may be utilized, or alternatively more than one of each maybe be utilized.). Preferably, all non-polar organic solvent utilized within the process are the same and all polar organic solvent utilized within the process are the same.

In any of the foregoing embodiments of the processes according to the first and second embodiments disclosed herein, the at least one polar organic solvent of the slurry (or within the solubilized TKS rubber solution of the third embodiment) and any additional polar organic solvent added to the miscella to form a reduced viscosity miscella or added elsewhere in the process may be selected from the group consisting of alcohols having 1 to 8 carbon atoms (e.g., ethanol, isopropanol, ethanol and the like); ethers and esters having from 2 to 8 carbon atoms; cyclic ethers having from 4 to 8 carbon atoms; and ketones having from 3 to 8 carbon atoms (e.g., acetone, methyl ethyl ketone and the like); and combinations thereof. In certain preferred embodiments of the processes disclosed herein, the at least one non-polar organic solvent and any additional non-polar organic solvent are each hexane or cyclohexane with the at least one polar organic solvent and any additional polar organic solvent optionally being acetone. Other polar organic solvents (individually or in combination) may be used in embodiments of the processes disclosed herein as long as the polar organic solvent preferentially solvates a portion of non-rubber extractables (e.g., resins) and acts (at a certain concentration) to coagulate natural rubber. In any of the embodiments of the processes disclosed herein, mixtures of two or more polar organic solvents may be utilized.

In any of the foregoing embodiments of the processes described herein, the at least one non-polar organic solvent that is contained within the slurry and any additional non-polar organic solvent added to the miscella to form a reduced viscosity miscella (or within the solubilized TKS rubber solution of the third embodiment) or elsewhere in the process may be selected from the group consisting of alkanes having from 4 to 9 carbon atoms (e.g., pentane, hexane, heptanes, nonane and the like); cycloalkanes and alkyl cycloalkanes having from 5 to 10 carbon atoms (e.g., cyclohexane, cyclopentane and the like); aromatics and alkyl substituted aromatics having from 6 to 12 carbon atoms (e.g., benzene, toluene, xylene and the like); and combinations thereof. In certain preferred embodiments according to the first, second and third embodiments of the processes disclosed herein, the at least one polar organic solvent of the slurry and any additional polar organic solvent are each acetone, and the at least one non-polar organic solvent of the slurry and any additional non-polar organic solvent are optionally hexane or cyclohexane. Other non-polar organic solvents (individually or in combination) may be used in embodiments of the processes according to the first, second and third embodiments disclosed herein as long as the non-polar organic solvent preferentially solvates natural rubber. In any of the embodiments of the processes disclosed herein, mixtures of two or more non-polar organic solvents may be utilized.

As previously discussed, in certain embodiments of the processes according to the first, second, and fourth embodiments described herein, the relative amount of at least one non-polar organic solvent and at least one polar organic solvent contained within the slurry (or for the third embodiment within the solubilized TKS rubber solution) is 50-90% by weight and 10-50% by weight, respectively, based upon the total amount of organic solvent. In certain preferred embodiments of the foregoing, the amount of the at least one non-polar organic solvent is 60-85% by weight and the amount of the at least one polar organic solvent is 15-40% by weight. In certain embodiments of the processes according to the first, second, and fourth embodiments disclosed herein, it is advantageous to control or adjust the viscosity of the combined organic solvent mixture (i.e., the at least one non-polar organic solvent and the at least one polar organic solvent) to 10-1000 centipoise, particularly for certain portions of the process such as the slurry portion where rubber and resin are being solubilized from the ruptured cells of the plant. In certain such embodiments, the viscosity of the combined organic solvent mixture is controlled or adjusted to 35-800 centipoise. Relatively higher viscosities within the foregoing ranges will be useful for a portion of the process where rubber and resin solubilization from the ruptured cells of the plant is occurring so as to maximize solubilization and minimize settling of bagasse particles. Conversely, a relatively lower viscosity within the foregoing ranges will be useful for a portion of the process where rubber and resin have already been solubilized, but the bagasse is being washed to ensure that solubilized rubber and resin are retained with the liquid/solvent instead of with the solvent-wet bagasse.

Miscellaneous

In various embodiments according to the processes disclosed herein, one or more antioxidants may optionally be utilized along with the TKS plant matter, the slurry or elsewhere in the process of removing rubber from the TKS plant matter. In preferred embodiments of the processes disclosed herein, one or more antioxidant are added to the clarified rubber solution before the relative amount of polar organic solvent as compared to non-polar organic solvent is increased. However, in other embodiments of the processes disclosed herein, one or more antioxidants may be added at one or more other points during the process. Preferably, when one or more antioxidants are added, they are added after removal of the at least 80%, at least 85% or at least 90% bagasse from the reduced viscosity miscella. Alternatively, in certain embodiments of the processes disclosed herein, one or more antioxidants may be added to the plant matter prior to its incorporation into the slurry. Suitable compounds for use as the one or more antioxidants in the processes disclosed herein include, but are not limited to, 2,6-di-t-butyl-4-methylphenol (also known as 2,6-di-t-butyl-p-cresol); N-(1,3-dimethylbutyl)-N'-phenyl-1,4-benzenediamine; octadecyl-3-(3,5-di-tert.butyl-4-hydroxyphenyl)-propionate (commercially available as Irganox® 1076); 4,6-bis (octylthiomethyl)-o-cresol (commercially available as Irganox® 1520), monohydric hindered phenols such as 6-t-butyl-2,4-xylenol, styrenated phenols, butylated octyl-phenols; bisphenols, for example 4,4'-butylidenebis(6-t-butyl-m-cresol), polybutylated bisphenol A, hindered hydroquinones such as 2,4-di-t-amylhydroquinone; polyphenols, such as butylated p-cresol-dicyclopentadiene copolymer; phenolic sulfides such as 4,4'-thiobis(6-t-butyl-3-methyl-phenol), alkylated-arylated bisphenol phosphites such as tris(nonylphenyl)phosphite, triazinetriones such as alkylated hydroxycinnamate triester of tris(2-hydroxyethyl)-triazin-etrione, tris(alkyhydroxybenzyl)-triazinetrione; pentaeryth-ritol esters such as tetrakis(methylene-3,5-di-t-butyl-4-hydroxyhydrocinnamate)-methane; substituted diphenylamines such as octylated diphenylamines, p-(p-touenesulfonamido)-di-phenylamine, nonylated diphenylamine, diisobutylene-diphenylamine reaction products; dihydroquinolines such as 6-dodecyl-1,2-dihydro-2,2,4-trimethylquinoline; dihydroquinoline polymers such as 1,2-dihydro-2,2,4-trimethylquinoline polymer; mercaptobenz-imidazoles such as 2-mercaptobenzimidazole; metal dithiocarbamates such as nickel dibutyldithiocarbamate, nickel diisobutyldithiocarbamate, nickel dimethyldithiocar-bamate; ketone/aldehyde-arylamine reaction products such as aniline-butyraldehyde condensation products, diarylam-ine-ketone-aldehyde reaction products; and substituted p-phenylenediamines such as di-b-naphthyl-p-phenylene-phenylenediamine and N-phenyl-N'-cyclohexyl-p-phe-nylenediamine. The total amount of the antioxidant employed in those embodiments of the processes disclosed that utilize at least one antioxidant herein may be in the range of 0.2% to 2% by weight of the purified solid rubber ultimately produced by the process (based upon the weight of the purified solid rubber containing less than 0.5 weight % solvent).

As previously discussed, in the processes according to the first and second embodiments disclosed herein, the relative amount of polar organic solvent as compared to non-polar organic solvent within the clarified rubber solution is increased so as to coagulate the rubber that is solubilized within the clarified rubber solution. In certain embodiments of the processes according to the first and second embodiments disclosed herein, the amount of polar organic solvent is increased by adding additional polar organic solvent. In other embodiments of the processes according to the first and second embodiments disclosed herein, the relative amount of polar organic solvent is increased by removing non-polar organic solvent. The relative amount of polar organic solvent is increased to an extent that causes the rubber contained within the clarified rubber solution to begin to coagulate. The particular amount of additional polar organic solvent that is added and/or the particular amount of non-polar organic solvent that is removed will depend upon the volume of the miscella and the relative amounts of polar and non-polar organic solvents contained within the miscella and upon the amount of rubber coagulation desired. Higher molecular weight rubber (which is generally more desirable in terms of a final product) will coagulate first. In certain embodiments according to the first, second and third embodiments, coagulation is controlled so that higher molecular weight rubber (preferably rubber with a molecular weight of at least 800,000 (e.g., 800,000-1,500,000), even more preferably at least 1,000,000 (e.g., 1,000,000-1,500,000)) coagulates and lower molecular weight rubber remains in solution. The molecular weights of rubber that are referred to herein are determined by GPC, utilizing a polystyrene standard.

In certain embodiments of the processes according to the first and second embodiments disclosed herein, it may be helpful to allow for some amount of settling time so that the fraction containing higher molecular weight rubber can separate from the lighter fraction containing lower molecular weight rubber and also resin. In certain embodiments of the processes of the first and second embodiments disclosed herein, a fractionator (optionally cone-shaped) may be utilized to assist in the separation whereby the heavier, higher molecular weight rubber fraction settles at the bottom of the fractionators and can be removed (such as by pumping) from the bottom. In certain embodiments of the processes of the first and second embodiments disclosed herein, the removal of the higher molecular weight rubber fraction is continuous so as to maintain a constant or relatively constant phase interface within the fractionator. The upper phase (containing lower molecular weight rubber and resin) can be separated and may be recycled or re-used in various ways. In certain embodiments of the processes of the first and second embodiments disclosed herein, the relative amount of polar organic solvent as compared to non-polar organic solvent can be increased by both adding additional polar organic solvent and removing non-polar organic solvent. In certain embodiments of the processes of the first and second embodiments disclosed herein, one or more than one additional polar organic solvent can be added to the clarified rubber solution in a total amount so as to coagulate the rubber solubilized therein. In preferred embodiments of the processes of the first and second embodiments disclosed herein, when additional polar organic solvent is added, it is the same polar organic solvent as is contained within the slurry. In other embodiments according to the first, second and third embodiments, when additional polar organic solvent is added, it may be a different polar organic solvent than is contained within the slurry.

As previously discussed, according to the processes disclosed herein in the first and second embodiments, solid purified rubber can be produced from the coagulated rubber that coagulates in the clarified rubber solution. Various processes can be utilized for isolating the solid purified rubber. These processes generally comprise removal of solvent (primarily non-polar organic solvent but also some polar organic solvent) associated with the coagulated rubber. Residual solvent can be removed from the coagulated rubber by evaporating the solvent such as with the application of heat and/or vacuum. In certain embodiments of the processes according to the first and second disclosed herein, the residual solvent is removed in one or multiple phases (two, three, four, five or more) that include the use of both heat and vacuum. In certain embodiments according to the processes of the first and second embodiments, heat that is applied preferably raises the temperature of the coagulated rubber to above the boiling point of the residual organic solvents associated with the coagulated rubber. In certain embodiments according to the processes of the processes of the first and second embodiments, this temperature is 40° C. to 100° C. in order to facilitate the removal of solvent. In certain embodiments according to the processes of the processes of the first and second embodiments, the pressure is reduced to 3-30 inches Hg (10-100 kPa) in order to facilitate the removal of solvent. Solvent that is removed can be condensed and recovered for further use. In preferred embodiments according to the processes of the processes of the first and second embodiments, the solid purified rubber that is produced has a molecular weight of at least 800,000 (e.g., 800,000-1,500,000), even more preferably at least 1,000,000 (e.g., 800,000-1,500,000), molecular weight being based upon a polystyrene standard. The amount of solvent that is removed from the coagulated rubber will vary according to desired use and shipment method. In certain embodiments according to the processes of the processes of the first and second embodiments, solid purified rubber can be collected into bales. In preferred embodiments according to the processes of the processes of the first and second embodiments, no more than 2 weight %, preferably no more than 1 weight % and even more preferably no more than 0.8 weight % of volatile matter (based upon the total weight of the solid purified rubber) remains within the solid purified rubber after it has been subjected to one or more solvent removal steps. As previously discussed, according to certain embodiments of the processes according to the processes of the processes of the first and second embodiments described herein, when the solid purified rubber contains 0.8 weight % volatile matter, it will also contain 0.05-0.5 weight % dirt, 0.2-1.5 weight % ash and 0.1-4 weight % resin. (It should be understood that the solid purified rubber produced according to the processes disclosed herein may contain relatively more or less organic solvent, and that the 0.8 weight % volatile matter is provided as an exemplary content for purposes of determining whether sufficient removal of dirt, ash and resin has been achieved. In certain preferred embodiments according to the processes of the processes of the first and second embodiments, the solid purified rubber contains 0.8 weight % or less volatile matter.

In certain embodiments of the processes according to the first and second described herein, the amount of rubber that is removed from the slurry represents at least 95 weight % (e.g., 95-99 weight % or 95-98 weight %) of the rubber that is contained within the plant matter-containing slurry. Preferably, in such embodiments, the plant matter is from TKS. In certain more preferred embodiments of the processes according to the first and second embodiments described herein, the amount of rubber that is removed from the slurry represents at least 96 weight % (e.g., 96-99 weight % or 96-99 weight %) of the rubber that is contained within the plant matter-containing slurry. Preferably, in such embodiments, the plant matter is from TKS. In preferred embodiments of the processes according to the first and second embodiments described herein, the amount of rubber that is removed from the slurry represents at least 98 weight % of the rubber that is contained within the plant matter-containing slurry. Preferably, in such embodiments, the plant matter is from TKS. Total rubber present in the plant matter-containing slurry can be determined following a similar method as to that used to determine total bagasse present in the slurry, as discussed above, except focusing upon the supernatants obtained from repeated centrifuging and rinsing. After all bagasse has been removed from the slurry sample (using the repeated centrifuging and rinsing procedure described previously), the supernatant portions are collected together and the rubber within is coagulated by adding additional polar solvent (the resin will remain solubilized). Polar solvent should be added beyond the point at which coagulation begins to ensure coagulation of lower molecular weight rubber as well as higher molecular weight rubber. The coagulated rubber can then be filtered away from the solvents, rinsed with several additional pure polar solvent fractions (the rinse being added to the resin-containing solvent portion). After drying (to remove any remaining solvent), the rubber is weighed and the total amount of rubber in the original plant matter-containing slurry can be calculated. Total resin present in the plant matter-containing slurry can be determined by drying the solvent left behind after the rubber coagulates (adding in all additional polar solvent rinses used to rinse the coagulated rubber).

Temperature

As previously discussed, multiple aspects of the processes according to the first and second embodiments disclosed herein are conducted at a temperature or temperatures of 10-80° C. and different aspects of the process may be conducted at the same temperature or at different temperatures) and a pressure of 35-1000 kPa. In certain embodiments according to the processes of the first and second embodiments disclosed herein, multiple aspects of the process are conducted at a temperature or temperatures of 10-50° C. (preferably those aspects of the process denoted as (a)-(e) in various embodiments herein and/or meeting the description of being prior to the stage where organic solvent is removed from coagulated rubber). As those skilled in the art will understand, the particular temperature or temperatures at which the individual aspects of the processes are conducted may vary depending upon the identity of the at least polar organic solvent and at least one non-polar organic solvent utilized. However, it is intended that those aspects of the processes according to the first, second, third and fourth embodiments disclosed herein that are directed to removing bagasse from the slurry to produce a miscella; adding additional polar organic solvent to produce a reduced viscosity miscella; removing 80-95 weight % bagasse from the reduced viscosity miscella (or the miscella) to form a purified miscella; and optionally treating the purified miscella to remove additional bagasse thereby producing a clarified rubber solution containing 0.01-1% by weight bagasse will be operated at a temperature or temperatures below the boiling point of the mixture of at least one polar organic solvent and at least one non-polar organic solvent utilized. Subsequent or later aspects of the processes according to the first, second, third, and fourth embodiments (i.e., increasing the relative amount of polar organic solvent as compared to non-polar organic solvent within the clarified rubber solution so as to coagulate the rubber and producing solid purified rubber from the coagulated rubber) are preferably conducted at a temperature or temperatures above the boiling point of the at least one polar organic solvent and/or above the boiling point of the mixture of the at least one polar organic solvent and at least one non-polar organic solvent.

Multiple steps within each of the first, second, third and fourth embodiments of the processes described herein are preferably conducted on a continuous basis. In certain embodiments of the first and second embodiments of the processes described herein, (a)-(g) are conducted on a continuous basis.

EXAMPLES

The following examples are for purposes of illustration only and are not intended to limit the scope of the claims which are appended hereto.

Unless otherwise defined, all technical and scientific terms used herein have the same meaning as commonly understood by one of ordinary skill in the art to which the technology of this application belongs. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative embodiments, and illustrative examples shown and described. Accordingly, departures may be made from such details without departing from the spirit or scope of the applicant's general inventive concept.

Example 1

A sample was prepared in order to simulate the removal of rubber from a non-*Hevea* rubber source. A champion bottle was used to prepare a sample that was 500 mL in volume and consisted of 12.4% (w/w) insoluble fines (the insoluble fines were bagasse and dirt/soil from harvesting of guayule shrub pellets), 4.8% (w/w) soluble rubber (obtained from coagulation of a natural rubber latex sourced from guayule shrubs) and 1.6% (w/w) mixed soluble resin plus degraded rubber. The mixed soluble resin plus degraded rubber and the insoluble fines were obtained from guayule shrub pellets using a co-solvent mix of 80 weight % hexane and 20 weight % acetone. The pellets had been prepared about 1.5 years earlier from chopped guayule shrub and stored. Upon use the pellets contained negligible, if any, moisture. The insoluble fines, soluble rubber and mixed soluble resin plus degraded rubber were dissolved using a co-solvent of acetone and hexane (the co-solvent contained 80 weight % hexane and 20 weight % acetone). The sample was shaken by hand and then quickly poured into 15 mL centrifuge tubes (shaking by hand between pours).

In order to simulate the step of removing bagasse, spin tests were conducted by placing the 15 mL centrifuge tubes into a Flottweg bottle centrifuge using settings of 1000×g (Sample 1-A) and 3000×g. (Sample 1-B) for the times indicated below in Table 1. A third treatment was conducted by first using a setting of 1000×g for 5 minutes and then subjecting the centrate from that test to a second spin treatment at 3000×g (Sample 1-C). Upon completion of the spinning, test samples were removed and analyzed to determine the amount of compacting of the solids and the % volume of sedimented material (results appear in Table 1). Thereafter, the centrate was decanted from the solids. Decanted centrate was analyzed after desolventization (to remove all or substantially all of the solvent and leave behind both soluble and insoluble solids). The percentage by weight of insoluble solids remaining could then be calculated and compared to the target of no more than 6% insoluble solids (results appear in Table 2). Thereafter, the solids from the bottom of the tube were analyzed to determine the relative amounts of soluble and insoluble solids contained therein (results appear in Table 2).

TABLE 1

| | Centrifuge setting | Time (minutes) | Sediment volume (%) | Packing |
|---|---|---|---|---|
| Sample 1-A | 1000 × g | 1 | 30 | medium compact |
| | | 2 | 30 | medium compact |
| | | 5 | 30 | medium compact |
| Sample 1-B | 3000 × g | 1 | 30 | medium compact |
| | | 2 | 30 | medium compact |
| | | 5 | 30 | medium compact |

TABLE 2

Dry substance analysis

| Stage of testing | % dissolved solids |
|---|---|
| Feed sample (before centrifuging) | 23.8 |
| Feed sample (before centrifuging) | 22.5 |

TABLE 2-continued

Dry substance analysis

| Stage of testing | % dissolved solids |
|---|---|
| Centrate from 1000 × g, 5 minutes | 11.6 (7.0% soluble and 4.6% insoluble) |
| Centrate from 3000 × g, 5 minutes | 10.5 (7.1% soluble and 3.4% insoluble) |

Example 2

In order to simulate the removal of rubber from a non-*Hevea* rubber source, several batches of rubber solution with different % fines were prepared as the feed material (the solutions were prepared from guayule shrub pellets and co-solvent of 80/20 hexane/acetone that were subjected to different treatments including screw press treatment). Sets of experiments were conducted with differing flow rates at 7000×g (low setting) and 12000×g (high setting) G-force. Centrate samples were collected from each set of experiments after centrifuging using a Westfalia Model CTC1 disc centrifuge. This disc centrifuge contains a bowl with 1 liter volume capacity and can hold up to 0.5 liters in solids. After centrifuging, solid rubber samples were coagulated from the centrate by adding additional acetone to the centrate until the rubber coagulated (generally rubber coagulation will occur at about 1.2:1 hexane/acetone weight ratio). The solvent was decanted from the coagulated rubber and the wet rubber that remained was desolventized by drying in a vacuum oven at 70° C. Ash and dirt concentrations within the dried rubber samples were analyzed using ASTM D1278-91. Results are summarized in Table 3.

TABLE 3

| % Fines in Feed | | | | Flow Rate | % Ash in | % Dirt in | Highest |
|---|---|---|---|---|---|---|---|
| w/w % | v/v % | Sample ID | G Force | (L/min) | Rubber | Rubber | TSR Met |
| 0.06 | 0.15 | 2688-131 | 7000 | 0.25 | 0.22 | 0.07 | TSR-10 |
| | | | 12000 | 0.25 | 0.17 | 0.15 | TSR-20 |
| 0.42 | 1 | 2688-139 | 7000 | 0.5 | 0.53 | 0.16 | TSR-20 |
| | | | | 1 | 0.67 | 0.16 | TSR-20 |
| | | | | 1.5 | 0.69 | 0.09 | TSR-20 |
| | | | 12000 | 0.5 | 0.34 | 0.09 | TSR-10 |
| | | | | 1 | 0.31 | 0.05 | TSR-CV |
| | | | | 1.5 | 0.47 | 0.16 | TSR-20 |
| 0.58 | 1.4 | 2688-129 | 7000 | 1.25 | 0.73 | — | |
| | | | 12000 | 0.5 | 0.15 | — | |
| 1.6 | 3.8 | 2688-137 | 7000 | 0.5 | 0.44 | — | |
| | | | | 1 | 0.54 | 0.14 | TSR-20 |
| | | | | 1.5 | 0.61 | 0.06 | TSR-10 |
| | | | 12000 | 0.5 | 0.24 | 0.04 | TSR-CV |
| | | | | 1 | 0.56 | 0.07 | TSR-10 |
| | | | | 1.5 | 0.60 | 0.13 | TSR-20 |
| 5.31 | 12.6 | 2688-141 | 7000 | 0.5 | 0.61 | 0.16 | TSR-20 |
| | | | | 1 | 0.86 | 0.22 | TSR-50 |
| | | | | 1.5 | 1.34 | 0.26 | TSR-50 |
| | | | 12000 | 0.5 | 0.27 | 0.12 | TSR-50 |
| | | | | 1 | 0.45 | 0.07 | TSR-10 |
| | | | | 1.5 | 0.53 | 0.17 | TSR-20 |
| 6.83 | 16.2 | 2688-143 | 7000 | 0.5 | 1.17 | 0.32 | TSR-50 |
| | | | | 1 | 1.64 | 0.38 | |
| | | | | 1.5 | 1.81 | — | |
| | | | 12000 | 0.5 | 0.72 | 0.08 | TSR-10 |
| | | | | 1 | 1.32 | 0.14 | TSR-50 |
| | | | | 1.5 | 1.20 | 0.05 | TSR-50 |

From these experiments, it is shown that a high G-force centrifuge is capable of separating feed materials with fines below about 13% (v/v) at flow rates of up to 1.5 L/minute to produce a final solid rubber that generally meets ISO TSR-50 standards. (ISO has specified six different grades for natural rubber by which the rubber is technically specified. The grades are referred to as TSR (Technically Specified Rubber). TSR L (high quality and light colored rubber prepared from latex), TSR CV (viscosity-stabilized high quality latex rubber), TSR 5 (good quality latex rubber, darker than TSR L), TSR 10 and 20 (good quality grades derived from field coagulum, suitable for general purpose uses), TSR 50 (up to 0.50% weight dirt content. The specifications and characteristics of TSR grades are summarized in Table 4.) With a lower flow rate of 0.5 L/minute, the particular bench top centrifuge was still able to handle feed material having fines of 16.2% (v/v) when operating at the high G force setting. For feed materials with fines of 12.6% (v/v) the flow rate needed to be limited to 1 L/minute in order for the final solid rubber to meet TSR-50 and have no more than 0.5 weight % dirt and no more than 1.5 weight % ash.

TABLE 4

| Parameters | Grades | | | | | |
|---|---|---|---|---|---|---|
| | TSR CV | TSR L | TSR 5 | TSR 10 | TSR 20 | TSR - 50 |
| Dirt (max) % wt | 0.05 | 0.05 | 0.05 | 0.10 | 0.20 | 0.50 |
| Ash (max) % wt | 0.60 | 0.60 | 0.50 | 0.75 | 1.00 | 1.50 |
| Nitrogen (max) % wt | 0.60 | 0.60 | 0.50 | 0.60 | 0.60 | 0.60 |
| Volatile matter (max) % wt | 0.80 | 0.80 | 0.80 | 0.80 | 0.80 | 0.80 |
| Initial wallace plasticity Po (Min) | | 30 | 30 | 30 | 30 | 30 |
| Plasticity Retention Index PRI (Min) | 60 | 60 | 60 | 50 | 40 | 30 |
| Color Lovibond Scale (individual value, max) | | 6 | | | | |
| Mooney viscosity (ML, 1 + 4, 100° C.) | 60 ± 5 | | | | | |

Example 3 (Preparation of Pellets from Guayule Shrubs)

Guayule shrubs that were approximately 7 years old were cut above the root during the winter. The cut shrubs were left in the field with the intention of drying. However, during harvest, heavy rains occurred that slowed the rate of drying. Because of the rain, no leaf removal operation was performed, but based upon the fact that spring regrowth of leaves had not yet begun, the weight percentage of the leaves was estimated to be less than 20% (on a dry basis). Approximately 3 weeks after harvesting had begun, the cut shrubs were subjected to coarse chopping to a maximum diameter of about ⅜" (0.95 cm) using a shredder/chopper. The chopped shrub pieces were placed in covered containers and transported to a pelletizing location. Upon receipt at the pelletizing location, the containers were immediately opened. Four days after receipt of the chopped material, processing was begun (processing began approximately 4 weeks after harvest). The entire shipment of chopped guayule material was first hammer milled using a ½" screen. The resulting material was then passed over a 20 mesh vibrating screen to remove fines. The oversized material that remained on the screen was pelletized using a ¼" die. The final moisture content of the pellets was found to be 16 weight % and upon analysis (using soxhlet extraction with acetone/pentane azeotrope) the pellets were found to contain 9% resin and 4.4% rubber. The pellets were shipped in a sealed 55 gallon drum container which upon receipt was opened, nitrogen purged and re-sealed.

Example 4 (Use of Screw Press to Remove Bagasse)

A 35 pound sample of slurry was utilized. The slurry was prepared by combining pellets made from guayule plant matter (as described in Example 3, above), hexane and acetone. The pellets were analyzed by screw press approximately 2 months after pelletization. (After receipt from the pelletizing location, the pellets were stored in a 55 gallon plastic drum which had been closed, nitrogen purged and sealed.) The target composition of the slurry was 18 weight % bagasse, 57 weight % hexane, 14 weight % acetone, 5 weight % rubber and 6 weight % resin (the bagasse, rubber and resin were all from the pellets). A screw press from Vincent Corporation (model number CP-4) was utilized to separate a quantity of the bagasse from the slurry and various combinations of discharge pressure and screw speed were evaluated. Three different screens with varying shape and size mesh were also evaluated. Two screens contained slot-shaped openings (one with openings 0.017" (0.043 cm) wide and the other with 0.011" (0.028 cm) wide openings). The third screen had circular openings with a diameter of 0.023" (0.058 cm). As provided in Table 5 below, various batches of the slurry were processed through the screw pressing, using the combinations of screen press speed and back pressure indicated. Batches 1-3 used the screen with 0.017" slot-shaped openings, batches 4-12 used the screen with 0.011" slot-shaped openings and batches 13-17 used the screen with 0.023" circular openings. The liquid (liquor) containing solubilized solvents, solubilized rubber, solubilized resins and some amount of bagasse was collected from the screw press outlet. The bagasse that had accumulated into a press cake was separately collected.

For most of the batches, samples were taken from the feed slurry (also called the original slurry), the press liquor and the bagasse press cake. The weight percentages of fines and rubber in samples of press liquor were determined by subjecting samples of the press liquor to centrifuging and then the supernatant from the centrifuging to coagulation (by addition of acetone) The weight percent solvent in the bagasse press cake samples was determined by weighing the cake sample before and after drying overnight in a vacuum oven at 70° C. The solids separation efficiency was determined according to the following equation: solids separation efficiency=((% biomass in original slurry)−(% fines in press liquor))/(% biomass+water in original slurry). The liquid separation efficiency was determined according to the following equation: liquid separation efficiency=((% liquid in original slurry)−(% liquid in press cake))/(% liquid phase in original slurry). (With the liquid phase including acetone, hexane and dissolved rubber and resin.) While the percent solids in the feed slurry is known to affect the separation efficiency of the screw press, that factor was minimized in the batches analyzed because % biomass+water in the original slurry (feed slurry) were maintained at around 22%.

TABLE 5

| | | | Analysis of liquor | | | | Analysis of bagasse cake | | |
|---|---|---|---|---|---|---|---|---|---|
| Batch # | Press speed (rpm) | Back pressure (psi/Pa) | % fines | % fines adjusted* | % rubber | Solids Separation efficiency | Solvent in cake | Solvent in cake (adj)* | Liquid separation efficiency |
| 1 | 100 | 10 | 8.1 | 8.1 | — | 0.58 | — | — | — |
| 2 | 60 | 10 | 15.2 | 14.0 | 5.5 | 0.37 | — | — | — |
| 3 | 45 | 10 | 16.8 | 16.8 | 6.2 | 0.16 | — | — | — |
| 4 | 45 | 10 | 8.7 | 11.2 | 4.1 | 0.50 | 48 | 52.5 | 0.32 |
| 5 | 100 | 15 | — | — | 4.4 | — | 28.5 | 31.2 | 0.60 |
| 6 | 100 | 5 | 6.7 | 8.3 | 4.7 | 0.61 | 40 | 41.7 | 0.47 |
| 7 | 60 | 5 | 11.5 | 12.9 | 4.1 | 0.39 | 48.8 | 49.9 | 0.37 |
| 8 | 150 | 5 | 11.5 | 14.6 | 3.8 | 0.31 | 35.8 | 49.6 | 0.37 |
| 9 | 150 | 10 | 8.5 | 11.2 | 4.0 | 0.55 | 39.3 | 48.5 | 0.36 |
| 10 | 150 | 10 | — | — | — | — | — | 50.2 | — |
| 11 | 140 | 10 | 11.1 | 13.9 | 5.5 | 0.34 | 38.6 | 44.2 | 0.44 |
| 12 | 160 | 10 | 6.8 | 8.2 | 2.5 | 0.53 | 43.2 | 51.2 | 0.38 |
| 13 | 100 | 10 | 11.2 | 16.2 | 5.1 | 0.48 | 43.2 | 50.1 | 0.27 |
| 14 | 60 | 10 | 9.6 | 13.5 | 4.6 | 0.52 | 41.2 | 49.0 | 0.32 |
| 15 | 40 | 10 | 8.9 | 12.3 | 4.3 | 0.55 | 42.0 | 50.2 | 0.31 |
| 16 | 25 | 10 | 7.5 | 9.5 | 4.4 | 0.55 | 43.8 | 46.2 | 0.41 |
| 17 | 25 | 5 | 6.8 | 8.7 | 4.6 | 0.60 | 43.6 | 50.8 | 0.35 |

*The adjusted numbers take into account solvent loss that occurred from evaporation due to the fact that the machinery was not sealed (by adding back in the lost solvent). Solvent loss was calculated as slurry weight minus wet cake weight minus clarified liquid weight.

As can be seen from a review of the data in Table 5, the screw press was able to achieve greater than 50% solids separation efficiency for each type of screen operated under at least one set of conditions.

Example 5 (Use of Screw Press to Remove Bagasse)

Four gallon quantities of slurry were prepared by combining wet guayule pellets with acetone, hexane and dry rubber. Prior to preparation of the slurry, the wet guayule pellets were found to contain 11.74 weight % moisture, 6.67 weight % rubber (dry weight basis) and 8.44 weight % resin (dry weight basis). The dry rubber was obtained by coagulating a sample of Yulex guayule latex, with 1 phr Santoflex 134 antioxidant added prior to coagulation). 5.56 pounds of wet pellets were mixed with 381.47 grams of dry rubber in 14.9 pounds hexane and 3.72 pounds acetone to produce the slurry. The feed slurry contained about 19% biomass and the liquid phase of the slurry (about 81 weight %) contained about 6 weight % rubber, 2 weight % resin and 92 weight % organic solvent. Samples of the slurry were subjected to two types of screw press evaluation. The first utilized a screw press/french oil mill manufactured by the French Oil Mill Machinery Company and the second utilized a screw press manufactured by Vincent Corporation. This screw press was a Vincent Corporation screw extruder (model no. CP-4).

The liquid (liquor) containing solubilized solvents, solubilized rubber, solubilized resins and some amount of bagasse (fines) was collected from the screw press outlet. The bagasse that had accumulated into a press cake was separately collected. The liquor and bagasse were analyzed by the same procedures described above in Example 4. The liquor was found to contain 4.23 weight % fines (biomass solids), based upon the total weight of the liquor. The percentage of the liquid phase from the slurry (i.e., acetone+hexane) that was recovered as liquor was 97.88 weight %. The percentage of biomass solids from the slurry that was recovered as press cake was 82.56 weight %.

Example 6 (Use of a Decanter Centrifuge to Remove Bagasse/Fines from a Slurry)

In order to simulate the removal of rubber from a non-*Hevea* or guayule source, slurries of varying concentration were prepared. Each slurry utilized a co-solvent mix of 80% weight hexane and 20% weight % acetone. To each slurry was added solids (consisting of insoluble fines, mainly bagasse and dirt/soil, from previous rubber harvesting of guayule shrub), rubber (obtained from coagulation of a natural rubber latex sourced from guayule shrubs), and resin (mixed soluble resin plus degraded rubber from previous harvesting of guayule shrub) in amounts sufficient to provide the slurry compositions summarized in Table 6.

TABLE 6

(Guayule Slurry Composition)

| | % solids | % rubber | % resin |
|---|---|---|---|
| Slurry 1 | 20.8 | 3.4 | 1.6 |
| Slurry 2 | 10.2 | 3.6 | 1.6 |
| Slurry 3 | 7.2 | 3.8 | 1.6 |
| Slurry 4 | 5.2 | 3.7 | 1.6 |

Each slurry was individually fed into a decanter-type centrifuge (Westfalia Separator Model CA-225-21-000, available from GEA Westfalia Separator Group, Elgin, Ill.). Various flow rates were utilized for each slurry, ranging from 1.0 gallon/minute to 5.5 gallons/minute, as shown in Table 6. The decanter centrifuge utilized is commonly referred to as a bowl-type centrifuge because it has a bowl-like appearance, wherein the bowl allows solids to be lifted out of the liquid. Slurry enters the decanter through a central feed tube and flows into the distributor chamber. From the distributor chamber, the slurry moves through ports into the centrifugation space of the bowl where it is accelerated to operating speed. The centrifuge was set up with a differential speed set to 24 rpm and the ring dam was set to 130 millimeters; the operating bowl speed was 4750 rpm, equating to a g force of 2500. Upon operation, the solid materials adhere to the bowl wall by centrifugal force. Within the bowl is a scroll which operates at a slightly faster speed than the bowl shell, thereby continually conveying separated solids toward the narrow end of the bowl. Solids are discharged from the centrifuge through ports in the bowl shell, into the catch chamber of the housing and are ejected through a solids chute.

Samples were taken of the centrate (miscella) and solids discharge for each slurry feed and flow rate. Centrate and solids were analyzed for % fines and % solvent, respectively. A portion of the centrate from each of the slurries at each flow rate indicated in Table 6 was further treated to isolate the rubber contained therein by adding additional acetone until the rubber coagulated (generally rubber coagulation occurs at about 1.2:1 hexane/acetone weight ratio). The solvent was decanted off of the coagulated rubber and the wet rubber that remained was desolventized by drying in a vacuum oven at 70° C. Ash and dirt concentrations within the dried rubber samples were analyzed using ASTM D1278-91. Results are summarized in Table 7. The decanter centrifuge was able to remove more than 90% of the bagasse contained within each original slurry mixture, regardless of flow rate, and was also able to produce a solids content (indicated as % fines in Table 6) of less than 1% for each original slurry mixture, regardless of flow rate. Notably in many instances, the solids content of the miscella was less than 0.5 weight % or even less than 0.3 weight %. Changes in flow rates did not produce a consistent impact on the solvent content of the solids discharge.

TABLE 7

| % Fines in Slurry w/w % | Flow Rate (gallon/minute) & (liters/minute) | % Fines in Miscella w/w % | % Solvent in Solid Discharge w/w % | % Bagasse Removal w/w % | % Ash in Dry Rubber w/w % |
| --- | --- | --- | --- | --- | --- |
| 5.2 | 1.0 3.79 | 0.18 | 69.3 | 96[1] | 1.05 |
|  | 2.0 7.57 | 0.24 | 65.3 |  | 1.14 |
|  | 3.0 11.36 | 0.26 | 62.7 |  | 1.14 |
| 7.2 | 5.5 20.82 | 0.27 | 54.9 | — | 1.20 |
|  | 4.5 17.03 | 0.40 | 56.3 |  | 1.22 |
| 10.2 | 1.0 3.79 | 0.31 | 56 | 97[1] | — |
|  | 2.0 7.57 | 0.29 | 54.4 |  | 2.19 |
|  | 3.0 11.36 | 0.37 | 60.2 |  | 1.37 |
| 20.8 | 3.0 11.36 | 0.56 | 53.8 | — | 1.56 |

[1]Percentages can be considered as an average from the three flow rates.

Example 7—Hammer Milling, Roll Milling/Cracking and Flaking (Flake Milling)

Guayule shrub approximately 8-36 months old was harvested and bundled into bales. The bales were measured to have a moisture content of about 20-25%. Bales were fed to a standard wood chipper to reduce the guayule material into approximately 1" sticks. The shredded sticks of guayule were fed through a hammer mill by hand for further size reduction. The hammer mill then air conveyed the milled shrub through a fan to a cyclone separator. Varied screen sizes for the hammer mill (1", ½", ⅛", and 1/16") were used. The milled shrub was collected in bins and weighed as it was being produced.

All of the shrub was processed through a Sweco screener with a 20 mesh screen. The screener was used to remove fines from the shrub. It was tested before and/or after milling.

The milled shrub was processed in a cracker (also known as a roller mill), set up to have a differential roll speed of 1:1.1. The roll spacing on the cracker was adjustable. The cracker was fed using a vibratory screen feeder and the cracked material was collected in bins.

The cracked material was transferred to a flaker. The flaker had its own roll feeder, a differential roll speed of 1:1.25 and the roll spacing was set at 0.012". Samples of the flaked material were taken and retained for cell rupture analysis and for initial shrub rubber content. Some of the flaked material was retained to be run through the flaker a second and a third time. The flaked material was collected in bins and weighed. The final flaked material was refrigerated until it was ready to be extracted.

Determination of the % rubber and resin in samples was made using 9-10 gram samples of guayule material, soxhlet extracting for 6 hours with co-solvent (31 mL acetone, 170 mL pentane) to solubilize rubber and resin. Solubilized rubber (contained within the pentane phase) was isolated using methanol coagulation, centrifuging and drying. More specifically, 20 mL of the extract from the soxhlet extraction was transferred to a centrifuge tube and 20 mL of methanol was added to coagulate the rubber. The tube and its contents was centrifuged at 1500 rpm for 20 minutes to separate coagulated rubber from solvent. The supernatant within the tube was decanted into a flask and reserved for % resin determination. The tube and its coagulated rubber contents were rinsed with an aliquot of acetone (10 mL) and the acetone was poured out of the tube into the flask containing the decanted supernatant. The remaining coagulated rubber within the tube was then placed into a vacuum oven that had been pre heated to 60° C. and dried under vacuum for 30 minutes. After cooling to room temperature, the tube was weighed and the amount of rubber therein was calculated. Resin content (contained within the acetone phase) was determined by utilizing the flask containing the supernatant and decanted acetone. The solvent was evaporated from the flask in a fume hood until near dryness. The remaining contents were then further dried by placing the flask into an oven at 110° C. for 30 minutes. After cooling, the flask was weighed and the amount of resin remaining in the flask was calculated. Results are summarized in Table 8.

TABLE 8

| Conditions | Avg. % Moisture | Avg. % Rubber (Dry Weight Base) | Avg. % Resin (Dry Weight Base) |
| --- | --- | --- | --- |
| Shredded & Hammermilled ½" | 26.79 | 2.34 | 6.70 |
| Shredded & Hammermilled ⅛" | 22.29 | 3.12 | 6.78 |
| Shredded & Hammermilled ⅛" & 20 mesh screened & flaked | 19.67 | 4.98 | 6.96 |
| Shredded & Hammermilled ⅛" & 20 mesh screened & three passes flaked | 19.52 | 5.61 | 7.33 |

Example 8 (Removal of Rubber from TKS Plant Matter)

Rubber was extracted from a sample of harvested TKS plant matter (2 to 3 year old TKS plants) and purified according to the following procedure. The harvested TKS plant matter was mainly comprised of root material from

*Taraxacum kok-saghyz* plants, which had been harvested, coarsely chopped (to an average size of about 2 cm in length and 0.2 cm in diameter, with the minimum size being 0.1 cm in diameter and 0.5 cm long and the maximum size being 0.7 cm in diameter and 7 cm long), washed extensively with water to remove the excess dirt and dried until water content reached less than 10% (by weight).

The dried TKS plant matter was then finely chopped using a lab blender to increase the surface area, resulting in a powder-like material which contained some larger size plant material. The majority of the finely chopped plant material (52.3% by weight) was between 2 mm and 250 µm in size. A 22% solution (by weight) of the finely chopped TKS plant matter was prepared by immersing the finely chopped TKS plant matter in a co-solvent (20% by weight acetone and 80% by weight hexane) and mixing with gentle agitation for 24 hours to create a slurry. (The 22% by weight solution contained 22 parts coagulated TKS rubber to 78 parts of co-solvent.) After agitation, the slurry was then filtered through a 45 µm sieve to remove the majority of the plant matter and dirt content (i.e., bagasse) producing a viscous rubber-containing solution (i.e., miscella); about 90% of the bagasse within the slurry was left behind on top of the sieve. To further reduce the ash content in the resulting rubber, the viscous solution (miscella) was centrifuged using an IEC/EXD centrifuge by Damon IEC at 1000 rpm for 1 hr. Once the centrifuge was stopped, it was observed that there was a solid precipitate on the bottom of the containers; the solid precipitate was made up of fine bagasse particles having a particle size smaller than 45 µm. The centrate resulting from the centrifuge (a viscous rubber-containing solution) was decanted into another container and subsequently coagulated through the addition of an equal volume of acetone to the centrate (i.e., 1 part centrate to 1 part acetone). The coagulated TKS rubber was collected by decanting away the solvent from the coagulated rubber. The coagulated TKS rubber was then redissolved in fresh co-solvent (20% by weight acetone and 80% by weight hexane) to make a 5% solution (by weight) solution with gentle agitation for 24 hours to create a viscous rubber-containing solution. (The 5% by weight solution contained 5 parts coagulated TKS rubber to 95 parts of co-solvent.) The resulting viscous TKS rubber-containing solution was then coagulated for a second time by the addition of an equal volume of acetone to the viscous TKS rubber-containing solution. The coagulated TKS rubber was collected by decanting away the solvent from the coagulated rubber.

Next, the coagulated TKS rubber was redissolved in fresh co-solvent (20% by weight acetone and 80% by weight hexane) to make a 5% solution (by weight) solution with gentle agitation for 24 hours. An antioxidant (Santoflex 134) was added to the solution in an amount of 1 phr based on the weight of the TKS rubber in solution. The resulting solution was then poured into aluminum trays and placed into a fume hood to dry overnight (approximately 8 to 12 hrs) at room temperature. The following day, the rubber was further dried to constant weight in a vacuum oven at 65° C. This dried TKS rubber was then peeled from the trays and evaluated according to the following procedures.

Analysis of the purified dried TKS rubber was performed using thermogravimetric analysis ("TGA") to determine the ash content of the rubber sample. The TGA instrument was a Q5000 model from TA instruments using a standard heating protocol from room temperature to 500° C. The TKS rubber molecular weight was measured by GPC. For the GPC determination, the rubber was dissolved in THF and 2 Tosoh TSK Gel GMHx1 columns were utilizing. Calibration was with polystyrene standards and the polyisoprene values were calculated using Mark-Houwink coefficients. Acetone extractables were evaluated using soxhlet extraction; in short, 3 grams of purified rubber was placed in a thimble filter and then placed into a soxhlet apparatus with acetone. The acetone was refluxed for 6 hrs, and then shut off. The acetone extracted rubber was dried overnight at room temperature in a fume hood. The rubber was further dried (in a vacuum oven at 65° C.) until constant weight was reached and the difference between the weight before and the weight after the soxhlet extraction is the acetone extractables content. Results are reported below in Table 9.

TABLE 9

|  | TKS (Example 8) |
|---|---|
| Ash, weight % | 0.12 |
| Weight average molecular weight ($M_w$, × $10^6$ g/mol) | 1.45 |
| Number average molecular weight ($M_n$, × $10^6$ g/mol) | 0.54 |
| Polydispersity index, $M_w/M_n$ (PDI) | 2.69 |
| Acetone extractables, weight % | 1.27 |
| Polymer weight % | 98.61 |

The TKS rubber sample prepared according to Example was found to have the impurities (i.e., acetone extractables and ash content) as listed in Table 9.

Example 9: Preparation of a Rubber Compound Using TKS-Sourced Natural Rubber

A rubber compound was prepared using TKS rubber obtained from the process discussed above in Example 8; compounding was performed using the formulation provided in Table 10. It is expected that the rubber from Example 8 will have compounded properties comparable to the compounded control *Hevea* rubber.

TABLE 10

| Ingredient | Amount (phr) |
|---|---|
| Master Batch | |
| Rubber | 100 |
| Carbon black (N343) | 42 |
| Stearic acid | 2 |
| Wax[1] | 1.5 |
| Antioxidant[2] | 2 |
| Resin[3] | 1 |
| Final Batch | |
| Zinc oxide | 3.5 |
| Antioxidant[4] | 0.3 |
| Accelerator[5] | 1 |
| Sulfur | 1.3 |

[1]microcrystalline wax blend (55% paraffin) by Hallstar
[2]Santoflex 13
[3]Hydrocarbon resin C5-C9 blend by Resinall
[4]2,2,4-trimethyl 1,2-hydroquinoline ("TMQ")
[5]N-cyclohexyl benzothiazole sulfenamide ("CBS")

First, a master batch was prepared in a 65-gram Brabender mixer using the ingredients listed in Table 10 under "Master Batch." At time=0, all polymer (i.e, the strips of rubber) was added into the mixer at 110° C. The mixer was set to 70 rpm. At time=30 sec. all the carbon black and the master batch ingredients were added into the batch. Once a total mixing time of 4 min. or a drop temperature of 145-150° C. was reached mixing was stopped and the batch was removed from the mixer. Compounded rubber was then rolled through a mill and cut into small strips for feeding for the final mix. Then, the additional ingredients listed in Table 5 under "Final Batch" were added. At time=0, all polymer (i.e., the strips of rubber) and the final batch ingredients were consecutively added into the mixer at 80° C. The mixer was set to 50 rpm. Once a total mixing time of 1 min. or a drop temperature of 110° C. was reached mixing was stopped and the batch was removed from the mixer. Compounded rubber was then rolled through a mill and sheeted out for curing.

Sample 1 used 100 phr of the TKS rubber that was purified using the procedure of Example 8. Sample 2 was a control that contained 100 phr of commercially available *Hevea* natural rubber. After curing at 145° C. for t90×1.5 minutes (t90 is the optimum vulcanization time obtained from Monsanto Rheometer for rubber), Samples 1 and 2 were subjected to physical testing for various dynamic and tensile properties and results are reported in Table 11 below. The value reported as t90 is a measure of the time (in minutes) required to reach 90% completion in curing. The viscoelastic properties of the cured rubber compounds were measured using the following methods. The first method is a temperature sweep test conducted with an Advanced Rheometric Expansion System (ARES) from TA Instruments. The test specimen has a rectangular geometry having a length of 47 mm, a thickness of 2 mm, and a width of 12.7 mm. The length of specimen between the grips on the test machine, i.e., the gap, is approximately 27 mm. The test is conducted using a frequency of 3.14 rad/sec. The temperature is started at −120° C. and increased to 100° C. The strain is 0.5% for the temperature range of −100° C. to −21° C., and 2% for the temperature range of −20° C. to 100° C. The second viscoelastic test is a strain sweep conducted with an Advanced Rheometric Expansion System (ARES) from TA Instruments. The test specimen has a cylindrical button geometry having a diameter of 9.27 mm and a 15.6 mm length. The test is conducted using a frequency of 3.14 rad/sec. The temperature is held constant at the desired temperature, i.e., 60° C. The strain is swept from 0.03% to 20%.

Tensile mechanical properties were determined following the guidelines, but not restricted to, the standard procedure described in ASTM-D412, using micro dumbbell specimens with a dimension of 4 mm in width and 1.91 mm in thickness. A specific gauge length of 44 mm was used for the tensile test. Specimens are strained at a constant rate and the resulting force is recorded as a function of extension (strain). Force readings are expressed as engineering stresses by reference to the original cross-sectional area of the test piece. The specimens are tested at 23° C. Breaking strength/tensile strength (Tb), elongation at break/elongation performance (Eb), Tb×Eb and modulus at 23° C. are also reported. The same tensile mechanical properties were also tested at 100° C.

TABLE 11

|  | Sample 1 | Sample 2 (Control) |
| --- | --- | --- |
| t90 (minutes) | 10.77 | 12.85 |
| G' (TS, 0° C., 10 Hz, 2%) (MPa) | 1.34 | 7.133 |
| tan δ (TS, 0° C., 10 Hz, 2%) | 0.2228 | 0.1961 |
| G' (TS, 60° C., 10 Hz, 2%) (MPa) | 0.477 | 4.247 |
| tan δ (TS, 60° C., 10 Hz, 2%) | 0.1404 | 0.1319 |
| ΔG' (SS, 50° C., 15 Hz, 0.03%-15%) | 1.649 | 1.574 |
| 50% Modulus @ 23° C. (MPa) | 1.074 | 1.382 |
| 300% Modulus @ 23° C. (MPa) | 11.279 | 14.41 |
| Tb @ 23° C. (MPa) | 30.6 | 29.3 |
| Eb @ 23° C. (%) | 598.79 | 508.29 |
| Toughness @ 23° C. (MPa) | 75.678 | 62.945 |
| 50% Modulus @ 100° C. (MPa) | 1.051 | 1.331 |
| 300% Modulus @ 100° C. (MPa) | 6.934 | 9.08 |
| Tb @ 100° C. (MPa) | 17.0 | 19.6 |
| Eb @ 100° C. (MPa) | 601.963 | 588.365 |
| Toughness @ 100° C. (MPa) | 51.309 | 54.674 |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A process for increasing the rubber recovery from TKS plant matter comprising:
   A. utilizing briquettes comprising (i) compressed chopped TKS plant matter having an average size of 1.5" or less, comprising bagasse, rubber, resin, residual water and (ii) no more than 5 weight % leaves, stems, crowns, and flowers, wherein the briquettes have a density that is 40-325% higher than the density of the non-compressed TKS plant matter;

B. subjecting the briquettes to an organic solvent extraction process whereby the briquettes are mixed with a co-solvent of at least one polar organic solvent and at least one non-polar organic solvent to form a slurry that contains TKS plant matter, organic solvents and 0.5-10 weight % water; and C. processing the slurry to remove bagasse and resin and recover at least 95-99% by weight of the rubber contained within the briquettes, wherein (B) and (C) comprise:

a. preparing a slurry from (i) the briquettes wherein the briquettes contain TKS plant matter comprising bagasse, rubber and resin, (ii) the at least one non-polar organic solvent and (iii) the at least one polar organic solvent, wherein the slurry contains 10-50% by weight TKS plant matter from the briquettes, 50-90% by weight of (ii) and (iii) combined, and 0.5-10 weight % water from the TKS plant matter;

b. removing a majority of the bagasse from the slurry to produce a miscella and a first bagasse portion;

c. optionally adding additional polar organic solvent, non-polar organic solvent or a combination thereof to the miscella to form a reduced viscosity miscella where any polar organic solvent and non-polar organic solvent may be the same or different than those utilized in (a) and where the amount of any additional polar organic solvent that is added is less than the amount that causes the rubber contained with the reduced viscosity miscella to coagulate;

d. removing 80-95 weight % of bagasse from the miscella resulting from (b) or (c) (based on the total weight of bagasse present in the miscella) to form a purified miscella and a second bagasse fraction wherein the majority of the bagasse that is removed has a particle size of less than 105 microns;

e. optionally treating the purified miscella to remove additional bagasse thereby producing a clarified rubber solution that contains 0.01-1% by weight of bagasse (based on the total weight of bagasse present in the slurry) wherein 90-99% of the additional bagasse that is removed has a particle size greater than 45 microns;

f. increasing the relative amount of polar organic solvent as compared to non-polar organic solvent within the clarified rubber solution from (e) or within the purified miscella from (d) so as to coagulate the rubber; and g. producing solid purified rubber from the coagulated rubber wherein when said solid purified rubber contains 0.8 weight % volatile matter it also contains 0.05-0.5 weight % dirt, 0.2-1.5 weight % ash and 0.1-4 weight % resin;

wherein at least (a)-(e) are conducted at a temperature or temperatures of 10-80° C. and a pressure of 35 to 1000 kPa.

2. The process of claim 1, wherein the briquettes contain at least one antioxidant.

3. The process of claim 1, wherein at least one of steps (b) and (d) comprises the use of a centrifuge.

4. The process of claim 1, wherein the briquettes contain at least one antioxidant.

5. The process of claim 1, wherein the majority of bagasse removed from the slurry in (b) is 60-95 weight % of the bagasse contained within the slurry.

6. The process of claim 1, wherein removing of the majority of bagasse in (b) comprises use of a screw press.

7. The process of claim 1, wherein removing of the majority of bagasse in (b) comprises use of a counter-current extractor.

8. The process of claim 1, wherein the TKS plant matter in the slurry has been in contact with the solvents (ii) and (iii) for 0.3 to 3 hours prior to (b).

9. The process of claim 1, wherein the removing of 80-95 weight % of bagasse removed in (d) comprises use of a centrifuge.

10. The process of claim 1, wherein at least a portion of at least one of the first bagasse portion and the second bagasse portion is recycled into the slurry so as to allow for transfer of additional rubber or resin that is associated with the bagasse portion(s) into the miscella that is produced in (b).

11. The process of claim 1, wherein the compressed chopped plant matter comprises TKS roots with no more than 5 weight % of the plant material comprising leaves, crowns, stems, and flowers.

12. The process of claim 1, wherein at least (a)-(e) are conducted at a temperature or temperatures of 10-50° C.

13. A process of claim 1, wherein the compressed chopped TKS plant matter comprises at least 90% by weight roots from *Taraxacum kok-saghyz*, *Scorzonera tau-saghyz*, *Scorzonera uzbekistanica*, and combinations thereof.

14. The process of claim 1, wherein the (ii) at least one non-polar organic solvent; and the (iii) at least one polar organic solvent are present in relative weight amounts of 50-90% and 10-50%, respectively.

15. The process of claim 1, wherein the non-polar organic solvent and any additional non-polar organic solvent comprises hexane or cyclohexane and the polar organic solvent and any additional polar organic solvent comprises acetone.

16. The process of claim 1, wherein the briquettes have been aged for 21-200 days after formation.

17. A process for increasing the rubber recovery from TKS plant matter comprising:

A. utilizing briquettes comprising (i) compressed chopped TKS plant matter comprising at least 90% by weight roots from *Taraxacum kok-saghyz*, the chopped TKS plant matter having an average size of 1.5" or less, comprising bagasse, rubber, resin, residual water and (ii) no more than 5 weight % leaves, stems, crowns, and flowers, wherein the briquettes have a density that is 40-325% higher than the density of the non-compressed TKS plant matter;

B. subjecting the briquettes to an organic solvent extraction process whereby the briquettes are mixed with a co-solvent of at least one polar organic solvent and at least one non-polar organic solvent to form a slurry that contains TKS plant matter, organic solvents and 0.5-10 weight % water; and C. processing the slurry to remove bagasse and resin and recover at least 95-99% by weight of the rubber contained within the briquettes, wherein (B) and (C) comprise:

a. preparing a slurry from (i) the briquettes wherein the briquettes contain TKS plant matter comprising bagasse, rubber and resin, (ii) the at least one non-polar organic solvent and (iii) the at least one polar organic solvent, wherein the slurry contains 10-50% by weight TKS plant matter from the briquettes, 50-90% by weight of (ii) and (iii) combined, and 0.5-10 weight % water from the TKS plant matter;

b. removing a majority of the bagasse from the slurry to produce a miscella and a first bagasse portion;
c. optionally adding additional polar organic solvent, non-polar organic solvent or a combination thereof to the miscella to form a reduced viscosity miscella where any polar organic solvent and non-polar organic solvent may be the same or different than those utilized in (a) and where the amount of any additional polar organic solvent that is added is less than the amount that causes the rubber contained with the reduced viscosity miscella to coagulate;
d. removing 80-95 weight % of bagasse from the miscella resulting from (b) or (c) (based on the total weight of bagasse present in the miscella) to form a purified miscella and a second bagasse fraction wherein the majority of the bagasse that is removed has a particle size of less than 105 microns;
e. optionally treating the purified miscella to remove additional bagasse thereby producing a clarified rubber solution that contains 0.01-1% by weight of bagasse (based on the total weight of bagasse present in the slurry) wherein 90-99% of the additional bagasse that is removed has a particle size greater than 45 microns;
f. increasing the relative amount of polar organic solvent as compared to non-polar organic solvent within the clarified rubber solution from (e) or within the purified miscella resulting from (d) so as to coagulate the rubber; and
g. producing solid purified rubber from the coagulated rubber wherein when said solid purified rubber contains 0.8 weight % volatile matter it also contains 0.05-0.5 weight % dirt, 0.2-1.5 weight % ash and 0.1-4 weight % resin;

wherein at least (a)-(e) are conducted at a temperature or temperatures of 10-80° C. and a pressure of 35 to 1000 kPa.

18. A process for increasing the rubber recovery from TKS plant matter comprising:
A. utilizing briquettes comprising (i) compressed chopped TKS plant matter comprising at least 90% by weight roots from *Taraxacum kok-saghyz*, the chopped TKS plant matter having an average size of 1.5" or less, comprising bagasse, rubber, resin, residual water and (ii) no more than 5 weight % leaves, stems, crowns, and flowers, wherein the briquettes have a density that is 40-325% higher than the density of the non-compressed TKS plant matter;
B. subjecting the briquettes to an organic solvent extraction process whereby the briquettes are mixed with a co-solvent of at least one polar organic solvent including acetone and at least one non-polar organic solvent comprising hexane, cyclohexane, or a combination thereof to form a slurry that contains TKS plant matter, organic solvents and 0.5-10 weight % water; and
C. processing the slurry to remove bagasse and resin and recover at least 95-99% by weight of the rubber contained within the briquettes, wherein (B) and (C) comprise:
a. preparing a slurry from (i) the briquettes wherein the briquettes contain TKS plant matter comprising bagasse, rubber and resin, (ii) the at least one non-polar organic solvent and (iii) the at least one polar organic solvent, wherein the slurry contains 10-50% by weight TKS plant matter from the briquettes, 50-90% by weight of (ii) and (iii) combined, and 0.5-10 weight % water from the TKS plant matter;
b. removing a majority of the bagasse from the slurry to produce a miscella and a first bagasse portion;
c. optionally adding additional polar organic solvent, non-polar organic solvent or a combination thereof to the miscella to form a reduced viscosity miscella where any polar organic solvent and non-polar organic solvent may be the same or different than those utilized in (a) and where the amount of any additional polar organic solvent that is added is less than the amount that causes the rubber contained with the reduced viscosity miscella to coagulate;
d. removing 80-95 weight % of bagasse from the miscella resulting from (b) or (c) (based on the total weight of bagasse present in the miscella) to form a purified miscella and a second bagasse fraction wherein the majority of the bagasse that is removed has a particle size of less than 105 microns;
e. optionally treating the purified miscella to remove additional bagasse thereby producing a clarified rubber solution that contains 0.01-1% by weight of bagasse (based on the total weight of bagasse present in the slurry) wherein 90-99% of the additional bagasse that is removed has a particle size greater than 45 microns;
f. increasing the relative amount of polar organic solvent as compared to non-polar organic solvent within the clarified rubber solution from (e) or within the purified miscella resulting from (d) so as to coagulate the rubber; and
g. producing solid purified rubber from the coagulated rubber wherein when said solid purified rubber contains 0.8 weight % volatile matter it also contains 0.05-0.5 weight % dirt, 0.2-1.5 weight % ash and 0.1-4 weight % resin;

wherein at least (a)-(e) are conducted at a temperature or temperatures of 10-80° C. and a pressure of 35 to 1000 kPa.

* * * * *